(12) United States Patent
O'Reilly et al.

(10) Patent No.: US 12,731,948 B2
(45) Date of Patent: Sep. 8, 2026

(54) RECHARGEABLE ELECTRICAL OUTLET WITH INTEGRATED LIGHTING WITH CONNECTIVITY

(71) Applicant: O'Reilly Winship, LLC, Dallas, TX (US)

(72) Inventors: Michael O'Reilly, Dallas, TX (US); Donnye Winship, Dallas, TX (US)

(73) Assignee: O'REILLY WINSHIP, LLC, Dallas, TX (US)

( * ) Notice: Subject to any disclaimer, the term of this patent is extended or adjusted under 35 U.S.C. 154(b) by 0 days.

(21) Appl. No.: 19/317,971

(22) Filed: Sep. 3, 2025

(65) Prior Publication Data

US 2026/0005479 A1 Jan. 1, 2026

Related U.S. Application Data

(63) Continuation of application No. 19/255,785, filed on Jun. 30, 2025, which is a continuation of application
(Continued)

(51) Int. Cl.
*H01R 13/717* (2006.01)
*F21S 8/00* (2006.01)
(Continued)

(52) U.S. Cl.
CPC .......... *H01R 13/7175* (2013.01); *F21S 8/035* (2013.01); *F21S 9/022* (2013.01);
(Continued)

(58) Field of Classification Search
None
See application file for complete search history.

(56) References Cited

U.S. PATENT DOCUMENTS 2,193,740 A 3/1940 Reed
3,739,226 A 6/1973 Seiter et al.
(Continued)

FOREIGN PATENT DOCUMENTS

CN 202976729 U 6/2013
CN 204424649 U 6/2015
(Continued)

OTHER PUBLICATIONS

Capstone Industries, Inc., Capstone 2 in 1 LED Night Light Power Failure Wall Plate, website and product.
(Continued)

*Primary Examiner* — Menatoallah Youssef
*Assistant Examiner* — Aqeel H Bukhari
(74) *Attorney, Agent, or Firm* — David W. Carstens; James H. Ortega; Carstens, Allen & Gourley, LLP

(57) ABSTRACT

A lighting device and system having a faceplate and a backplate. The faceplate or the backplate may have an arm or a set of arms having electrical conductors to connect or couple to the electrical contact points of an outlet, plug, or switch. The operational modes may be in an emergency lighting mode and a nightlight mode. The voltage source can be connected to a light source or sensor through the control circuit or the switch, and the light source may be activated based on the output of the sensor. A controller is connected to the sensor and can send or receive wireless signals through a wireless module.

20 Claims, 14 Drawing Sheets

Related U.S. Application Data

No. 18/893,494, filed on Sep. 23, 2024, now Pat. No. 12,347,979, which is a continuation of application No. 17/886,933, filed on Aug. 12, 2022, now Pat. No. 12,100,919, which is a continuation-in-part of application No. 17/094,644, filed on Nov. 10, 2020, now Pat. No. 11,489,298, and a continuation-in-part of application No. 17/069,664, filed on Oct. 13, 2020, now Pat. No. 11,444,416, said application No. 17/094,644 is a continuation-in-part of application No. 16/834,803, filed on Mar. 30, 2020, now Pat. No. 10,833,460, said application No. 17/069,664 is a continuation of application No. 16/665,887, filed on Oct. 28, 2019, now Pat. No. 10,804,658, said application No. 16/834,803 is a continuation-in-part of application No. 16/381,822, filed on Apr. 11, 2019, now Pat. No. 10,644,465, said application No. 16/665,887 is a continuation of application No. 16/138,364, filed on Sep. 21, 2018, now Pat. No. 10,665,996, which is a continuation-in-part of application No. 15/984,005, filed on May 18, 2018, now Pat. No. 10,364,977, said application No. 16/381,822 is a continuation-in-part of application No. 15/984,005, filed on May 18, 2018, now Pat. No. 10,364,977.

(60) Provisional application No. 62/673,630, filed on May 18, 2018, provisional application No. 62/561,308, filed on Sep. 21, 2017.

(51) Int. Cl.

| | |
|---|---|
| ***F21S 9/02*** | (2006.01) |
| ***F21Y 115/10*** | (2016.01) |
| ***H01R 13/70*** | (2006.01) |
| ***H01R 13/713*** | (2006.01) |
| ***H01R 24/68*** | (2011.01) |
| ***H01R 27/02*** | (2006.01) |
| ***H01R 31/06*** | (2006.01) |
| ***H02J 7/00*** | (2026.01) |
| ***H02J 7/34*** | (2006.01) |
| ***H02J 7/70*** | (2026.01) |
| ***H05B 45/30*** | (2020.01) |
| ***H05B 45/37*** | (2020.01) |
| ***H05B 45/395*** | (2020.01) |

(52) U.S. Cl.

CPC ......... *H01R 13/701* (2013.01); *H01R 13/713* (2013.01); *H01R 31/065* (2013.01); *H02J 7/70* (2026.01); *H02J 7/751* (2026.01); *H02J 7/865* (2026.01); *H05B 45/30* (2020.01); *F21Y 2115/10* (2016.08); *H01R 24/68* (2013.01); *H01R 27/02* (2013.01); *H02J 7/345* (2013.01); *H05B 45/37* (2020.01); *H05B 45/395* (2020.01)

(56) References Cited

U.S. PATENT DOCUMENTS 3,976,986 A 8/1976 Zabroski
4,410,835 A 10/1983 Zabroski
4,514,789 A 4/1985 Jester
5,485,356 A 1/1996 Nguyen
5,610,802 A 3/1997 Eidler et al.
5,683,166 A 11/1997 Lutzker
6,000,807 A 12/1999 Moreland
6,051,787 A 4/2000 Rintz
6,087,588 A 7/2000 Soules
6,200,159 B1 3/2001 Chou
6,297,450 B1 10/2001 Yu
6,423,900 B1 7/2002 Soules
6,897,379 B1 5/2005 Hsiao
7,270,436 B2 9/2007 Jasper
7,442,090 B2 10/2008 Mori et al.
7,549,785 B2 6/2009 Faunce
7,581,844 B1 9/2009 Yang
8,119,910 B1 2/2012 Golden et al.
8,149,570 B2 4/2012 Keebler et al.
8,158,883 B2 4/2012 Soffer
8,668,347 B2 3/2014 Ebeling
8,912,442 B2 12/2014 Smith
9,035,180 B2 5/2015 Smith et al.
9,035,181 B2 5/2015 Smith et al.
9,362,728 B2 6/2016 Smith et al.
9,482,426 B2 11/2016 Diotte
D781,241 S 3/2017 Knight
9,635,773 B1 4/2017 Marshall
9,742,111 B2 8/2017 Smith et al.
9,744,374 B1 8/2017 Bower et al.
9,768,562 B2 9/2017 Smith et al.
9,774,154 B2 9/2017 Laurent et al.
9,787,025 B2 10/2017 Smith et al.
9,807,829 B2 10/2017 Jensen
9,832,841 B2 11/2017 Knight et al.
9,871,324 B2 1/2018 Smith et al.
9,882,318 B2 1/2018 Smith et al.
9,882,361 B2 1/2018 Smith et al.
D809,899 S 2/2018 Knight et al.
D810,697 S 2/2018 Smith
9,899,814 B2 2/2018 Smith et al.
9,917,430 B2 3/2018 Smith et al.
D819,426 S 6/2018 Smith et al.
9,997,860 B1 6/2018 Hernandez, Jr.
D832,223 S 10/2018 Knight
D832,224 S 10/2018 Knight
10,109,945 B2 10/2018 Smith et al.
10,364,977 B2 7/2019 O'Reilly et al.
10,381,789 B2 8/2019 Smith et al.
10,644,465 B2 5/2020 O'Reilly et al.
10,804,658 B2 10/2020 O'Reilly et al.
11,489,298 B2 11/2022 O'Reilly et al.
2003/0092297 A1 5/2003 Reindle et al.
2004/0142601 A1 7/2004 Luu
2005/0135103 A1 6/2005 Evans
2005/0161249 A1* 7/2005 McBain .................. H02G 3/14 174/135
2006/0072302 A1 4/2006 Chien
2006/0073731 A1 4/2006 Chien
2009/0180271 A1* 7/2009 Jachmann ............. H05B 47/11 362/183
2012/0068612 A1 3/2012 Ebeling
2013/0032594 A1 2/2013 Smith
2016/0248202 A1 8/2016 Smith et al.
2017/0022364 A1 1/2017 Cox
2017/0222364 A1 8/2017 Smith et al.
2018/0048099 A1 2/2018 Diotte et al.
2019/0020156 A1 1/2019 Smith et al.
2019/0097834 A1 3/2019 Dempsey
2019/0122832 A1 4/2019 Smith
2019/0237917 A1 8/2019 O'Reilly et al.
2020/0036141 A1 1/2020 Smith et al.
2020/0242902 A1 7/2020 Derickson
2020/0251861 A1 8/2020 O'Reilly et al.
2020/0412070 A1 12/2020 Owen et al.
2021/0057856 A1 2/2021 O'Reilly et al.

FOREIGN PATENT DOCUMENTS

CN 105490099 A 4/2016
DE 10149860 A1 4/2003
DE 202014001980 U1 8/2014
DE 102014001371 A1 8/2015
JP H01204389 A 8/1989
JP H05100624 A 4/1993
JP H08102201 A 4/1996
JP H08288073 A 11/1996
JP 2002538579 A 11/2002

(56) References Cited

FOREIGN PATENT DOCUMENTS

| | | | |
|---|---|---|---|
| JP | 2011049100 | A | 3/2011 |
| KR | 101022746 | B1 | 3/2011 |
| WO | 2015078079 | A1 | 6/2015 |

OTHER PUBLICATIONS

Search Report and Written Opinion for PCT Application No. PCT/US2021/058632 Dated Feb. 4, 2022.

* cited by examiner

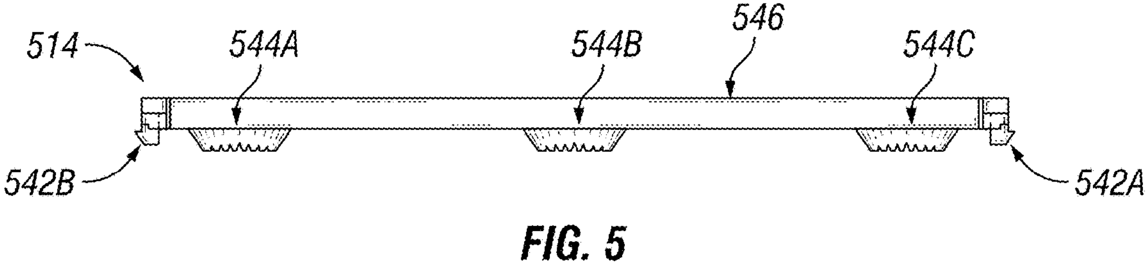
FIG. 5
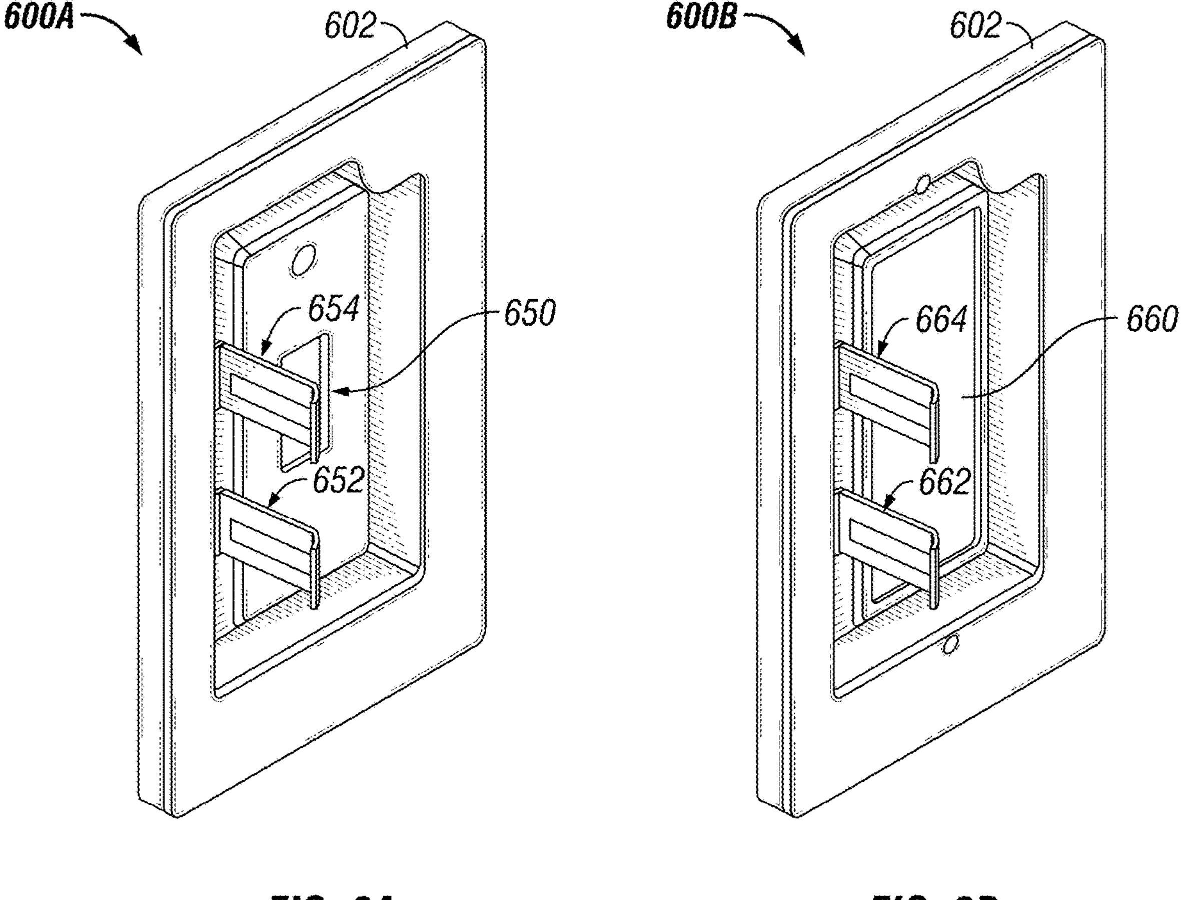
FIG. 6A
FIG. 6B

RECHARGEABLE ELECTRICAL OUTLET WITH INTEGRATED LIGHTING WITH CONNECTIVITY

CROSS-REFERENCE TO RELATED APPLICATIONS

This application is a continuation of U.S. Non-Provisional application Ser. No. 19/255,785, filed Jun. 30, 2025, which is a continuation of U.S. Non-Provisional application Ser. No. 18/893,494, filed Sep. 23, 2024, now U.S. Pat. No. 12,347,979, which is a continuation of U.S. Non-Provisional application Ser. No. 17/886,933, filed Aug. 12, 2022, now U.S. Pat. No. 12,100,919, which is a continuation-in-part of U.S. Non-Provisional application Ser. No. 17/069,664, filed Oct. 13, 2020, now U.S. Pat. No. 11,444,416, which is a continuation of U.S. Non-Provisional application Ser. No. 16/665,887, filed Oct. 28, 2019, now U.S. Pat. No. 10,804,658, which is a continuation of U.S. Non-Provisional application Ser. No. 16/138,364, filed Sep. 21, 2018, now U.S. Pat. No. 10,665,996, which claims the benefit of U.S. Provisional Application No. 62/673,630, filed May 18, 2018, and also is a continuation-in-part of U.S. Non-Provisional application Ser. No. 15/984,005, filed May 18, 2018, now U.S. Pat. No. 10,364,977, which claims the benefit of U.S. Provisional Application No. 62/561,308, filed Sep. 21, 2017, wherein the disclosures of each of these are incorporated herein by reference.

U.S. Non-Provisional application Ser. No. 17/886,933, filed Aug. 12, 2022, now U.S. Pat. No. 12,100,919, also is a continuation-in-part of U.S. Non-Provisional application Ser. No. 17/094,644, filed Nov. 10, 2020, now U.S. Pat. No. 11,489,298, which is a continuation-in-part of U.S. Non-Provisional application Ser. No. 16/834,803, filed Mar. 30, 2020, now U.S. Pat. No. 10,833,460, which is a continuation of U.S. Non-Provisional application Ser. No. 16/381,822, filed Apr. 11, 2019, now U.S. Pat. No. 10,644,465, which is a continuation-in-part of U.S. Non-Provisional application Ser. No. 15/984,005, filed May 18, 2018, now U.S. Pat. No. 10,364,977, which claims the benefit of U.S. Provisional Application No. 62/561,308, filed Sep. 21, 2017, wherein the disclosures of each of these are incorporated herein by reference.

TECHNICAL FIELD

The present disclosure relates to a light emitting electrical outlet. More particularly, and not by way of limitation, the present disclosure is directed to a system and apparatus for a light emitting electrical outlet.

BACKGROUND

Electrical outlets are a necessary part of everyday life for a majority of people throughout the world. However, there are two major drawbacks with traditional electrical outlets. First, they do not operate without a power source, and second, they are often placed in locations that are either not lighted well or completely devoid of any light source requiring lamps or flashlights in order to plug any device into them.

Additionally, electrical outlets are often taken up by nightlights, especially in the rooms of small children. While nightlights, and emergency lighting devices have been around for many years, each have their own individual downfalls. Nightlights in particular often require at least one electrical outlet or socket to be used, while in some cases both outlets are used by the nightlight. These lights also can become very hot, and if other items in a room such as a child's blanket or stuffed animal comes in contact with the nightlight for an extended period then a fire hazard, or even an actual fire can result. For emergency lighting, there is typically no manner of operation that allows the light to be utilized in anything other than in an emergency. Additionally, these lights typically use at least one if not both outlets of a traditional electrical plug outlet or socket.

One of the additional downfalls of these devices is there is no manner or means for dual operation for a nightlight and emergency lighting. In many cases, a nightlight cannot operate as an emergency light due a requirement that they be plugged into an outlet or socket that cannot provide power during a power outage. Many nightlights also do not include light detectors or photovoltaic cell to determine when daylight or other lights sources are sufficient to turn off and/or allow the nightlight to cool. Conversely, emergency lights are not conducive to use as nightlights because emergency lights require large batteries or other energy source that can be utilized in the event of a power failure to produce a strong or high intensity light, along with circuitry to detect when a power failure occurs. These emergency lights are also often connected together to the battery backup system for an entire building but cannot provide lighting to pathways or in rooms that are not connected to the battery backup system.

In addition, it may be useful for the emergency lights to communicate with each other and other entities via a connection so that emergency lights may be engaged from a location at a specified distance from the source of the emergency. For instance, a fire in one room of a commercial building may necessitate the need for all emergency lighting in a building, including emergency lights featured in an electrical outlet, to be turned on to assist in the navigation of the occupants in the building.

It would be advantageous to have an apparatus, and system for an electrical outlet faceplate with integrated lighting that overcomes the disadvantages of the prior art. The present disclosure provides such an apparatus and system.

BRIEF SUMMARY

The present disclosure is directed to a lighting device. The lighting device may be utilized throughout homes, businesses, storage areas, and anywhere where electrical power can be provided. The lighting device may receive an electrical power signal from electrical power source. Thus, in one aspect, the present disclosure is directed to a lighting device incorporated within an electrical outlet or socket faceplate. The lighting device can receive electrical power from an electrical outlet via the contact points of the plug, outlet and/or switch.

In another aspect, the present disclosure is directed to a nightlight device incorporated within an electrical outlet or socket to provide a small amount of light for small children or those that have to get up during the night. In yet another aspect, the present disclosure is directed to an emergency light for use during a power failure. When a power failure occurs the lighting device may active its light source to provide light to the area and environment in which it has been placed.

In another aspect, the present disclosure is directed to a communications module incorporated within an electrical outlet or socket cover. The communications module may be enabled to communicate with a transmitter and/or receiver such as, but not limited to, a base station, a user, one or more electrical outlets or socket covers within the system, in a second system, and/or an entity outside the system, through a communication means such as a network. This communication means may be conducted wirelessly with a wireless module incorporated within at least one electrical outlet or socket cover.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

FIG. 5 is an illustration of a light source.

FIG. 6A is an illustration of an alternative outlet cover in rear perspective view.

FIG. 6B is an illustration of an alternative outlet cover in rear perspective view.

DETAILED DESCRIPTION

Figures 1A, 1B:
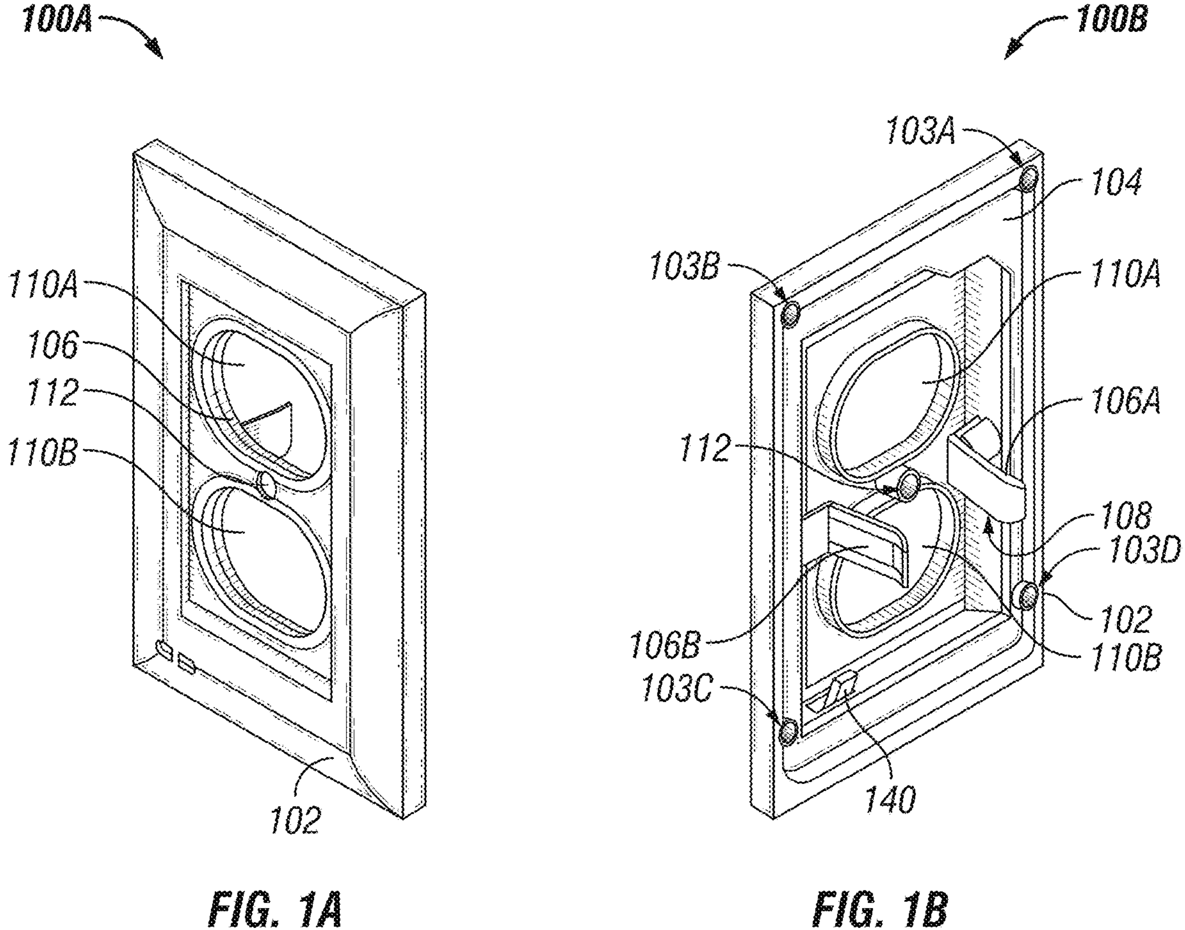
FIG. 1A is an illustration of an outlet cover in a front perspective view.
FIG. 1B is an illustration of an outlet cover in a rear perspective view.

An embodiment of the disclosure will now be described. FIG. 1A is an illustration of an outlet cover 100A in a front perspective view. The outlet cover 100A may have a faceplate 102. The faceplate 102 can also have an outlet opening or set of outlet openings 110A and/or 110B. The faceplate 102, in one embodiment of the present disclosure, would be a faceplate for an electrical outlet, but it would be understood that other faceplates and/or covers could also be replaced with the outlet cover 100A. The other faceplates and/or openings, could include, but are not limited to, electrical outlets, light switches, alarm boxes, thermostats, and/or objects or devices connected to electrical power.

The faceplate 102 and/or backplate (not illustrated) may also have an arm 106 extending from, affixed to, or attached to the outlet cover 100A. The arm 106 can also have an electrical conductor that may attach to a power source, or electrical energy to power a nightlight and/or emergency light circuit. The outlet cover 100A can be connected to an electrical outlet or switch through a fastener opening 112. The fastener opening may allow for any number of fasteners, such as, but not limited to, screws, nails, clips, adhesives, glues, synthetic materials, dovetail, tongue and groove, post and hole, snaps or a snap like connection, or any other attachment means or method, or any combination thereof.

FIG. 1B is an illustration of an outlet cover 100B in a rear perspective view. The outlet cover 100B may have a faceplate 102, and can also have a backplate 104, that in one embodiment of the present disclosure may be removably coupled. The backplate 104 may be removably coupled to the faceplate 102 through a set of fasteners 103A, 103B, 103C, and/or 103D (collectively 103). It would be understood that the faceplate 102, and the backplate 104 may also be removably coupled through other fasteners such as screws, nails, clips, adhesives, glues, synthetic materials, dovetail, tongue and groove, post and hole, snaps or a snap like connection, or any other attachment means or method, or any combination thereof.

The backplate 104 may also comprise a first arm 106A and/or a second arm 106B (collectively an arm 106, or an at least one arm). The arm 106 can extend from, be attached and/or affixed to the backplate 104 via a fastener(s). The arm 106 may also have an electrical conductor 108 (or at least one electrical conductor) attached, affixed, or housed within the arm 106. The electrical conductor 108, may include, but is not limited to having a bump, square, spring, block, tab, or other electrical conducting material and/or shape. The electrical conductor 108 can attach or connect to a power source, or electrical signal. In one embodiment of the present disclosure, the power source, or electrical signal may be an Alternating Current ("AC") voltage.

The power source and/or electrical signal may result from replacing a traditional outlet or switch cover or faceplate with the outlet cover 100B. The outlet and/or switch can be placed through the outlet openings 110A and/or 110B. It would be understood that different configurations of the outlet opening(s) could also be utilized such as, but not limited to, a single plug or switch configuration, a double plug or switch configuration, a triple plug or switch configuration, a quad plug or switch configuration, and/or as many plugs or switches as may be used in a particular configuration. The outlet cover 100B can be attached to an outlet or switch through a fastener opening 112, and additional openings may be utilized if a different plug and/or switch configuration is utilized.

In one embodiment of the present disclosure, a switch 140 may be utilized to switch or shift between multiple operating modes of the outlet cover 100B. The switching or shifting between multiple operating modes may be an instantaneous or approximately instantaneous switching or shifting. The switch 140 may be attached, affixed, and/or housed within the faceplate 102 and/or the backplate 104. The operating modes can include, but are not limited to, a nightlight mode and/or an emergency lighting mode.

Figure 2:
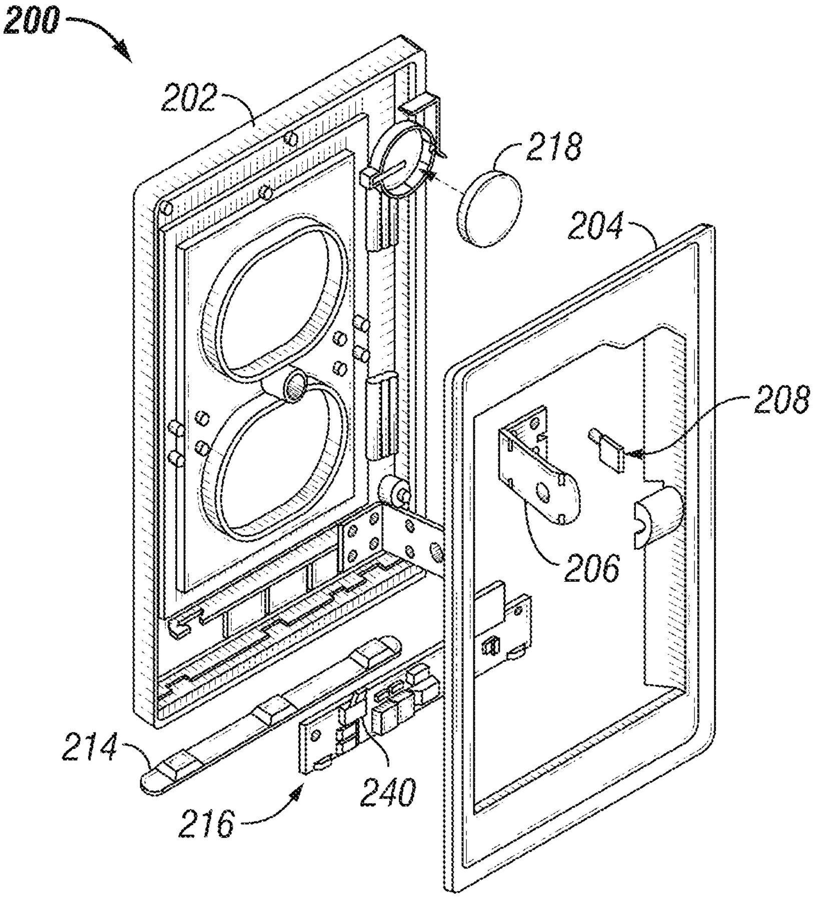
FIG. 2 is an illustration of an outlet cover in a rear exploded view.

FIG. 2 is an illustration of an outlet cover 200 in a rear exploded view. The outlet cover 200 may be comprised of a faceplate 202, and/or a backplate 204. The faceplate 202, and/or backplate 204 may also connect, affix, attach, and/or comprise an arm 206. The arm 206 may have an electrical conductor 208 connected, affixed, attached, and/or housed within it. The arm 206, and/or the electrical conductor 208 may also have wires or other electrically conductive materials affixed, attached, and/or housed within them.

The outlet cover 200 may also have a light source 214 for producing, generating, and/or emitting light. A control circuit 216 can control when and/or if the light source 214 is active. The control circuit 216 may also be connected to a battery 218. The battery 218 can allow for the storing of energy from an incoming voltage source. The light source 214, the control circuit 216, and/or the battery 218 can be connected, attached, affixed, and/or housed within the outlet cover 200. For example, in one embodiment of the present disclosure the light source 214, the control circuit 216, and/or the battery 218 may be removably connected, attached, affixed, and/or housed within the faceplate 202. Alternatively, the light source 214, the control circuit 216, and/or the battery 218 may be removably connected, attached, affixed, and/or housed within the backplate 204.

The battery 218 may be connected to the power source and/or electrical signal through the control circuit 216. Alternatively, the battery may also be connected directly or indirectly to the electrical conductor 208 through wires or other electrically conductive materials. The battery 218 may also provide energy and/or power to the light source 214. In one embodiment of the present disclosure, the light source 214 may be directly or indirectly connected to the power source and/or electrical signal. The light source 214 may be housed or enclosed within the faceplate 202 and/or backplate 204 such that an opening may be created that is defined by the faceplate 202 and/or the backplate 204. The control circuit 216 may also have a switch 240 that may control if the outlet cover 200 can operate in a nightlight or emergency light mode of operation, or some other mode of operation as well.

Figures 3, 4:
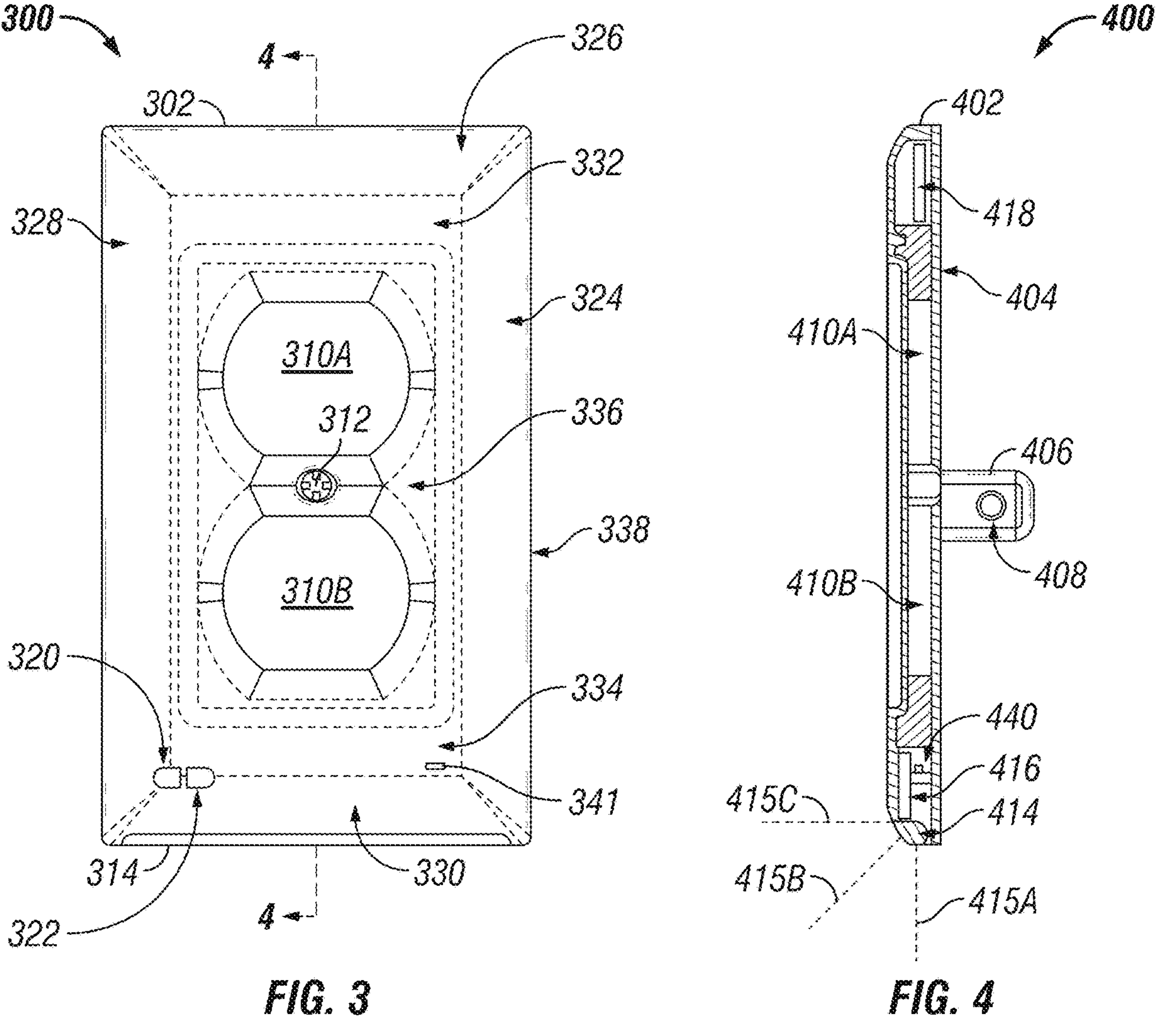
FIG. 3 is an illustration of an outlet cover in a front view.
FIG. 4 is an illustration of an outlet cover in a side view.

FIG. 3 is an illustration of an outlet cover 300 in a front view. The outlet cover 300, may have a faceplate 302, which may also be described as a cover, a switch or outlet faceplate, or a switch or outlet cover. The faceplate 302 may have or define at least one outlet opening 310A and/or 310B (collectively 310). While depicted as an oblong oval or rectangle, it would be understood that any shape could be utilized for the opening(s) and/or to define an opening or aperture such as, but not limited to, a square, sphere, cylinders, polygons, ellipses, crescents, cubes, cuboids, ellipsoids, cones, prisms, pyramids, or combinations thereof.

The faceplate 302 may also have or define a fastener opening 312 that may be utilized to place a fastener, such as, but not limited to, a screw, a bolt, a nail, adhesives, glues, synthetic fasteners, metallic fasteners, wood fasteners, alloy fasteners, wood fasteners, other forms or types of fasteners, and/or any combination thereof. The faceplate 302 can also have a light source 314, which may include a light bar in one embodiment, and/or a combination of light bulbs or light emitting diodes such as, but not limited to, LEDs, and/or OLEDs (or at least on LED or OLED). An indicator 320 and/or a sensor 322 may also be housed within the faceplate 302 and/or backplate (not illustrated), or have an aperture, housing, and/or void defined by the faceplate 302 and/or backplate (not illustrated). The indicator 320 can be utilized by, but is not limited to, informing a user when a power source is providing power and/or energy to the outlet cover 300, when the battery is active, and/or which mode the outlet cover is operating in. The indicator 320 may also be placed in aperture defined by the faceplate 302 and/or backplate 304 or may be affixed to the faceplate 302 directly or through a lens. The sensor 322 (or at least one sensor) may include but is not limited to, a light sensor, photo resistor, photodiode, and/or phototransistor, for detecting and/or measuring the amount of ambient light, or other environmental conditions in a local environment. The sensor 322 may also be placed in aperture defined by the faceplate 302, and/or backplate 304, or affixed to the faceplate 302 directly or through a lens to allow it to respond to environmental conditions. In one embodiment, the sensor 322 may also include at least one sensor or other environmental sensors such as, but not limited to, humidity, temperature, air quality, carbon dioxide, carbon monoxide, nitrogen dioxide, vibration, accelerometer, microphones, sound detection, gas sensors, pressure sensors, tilt sensors, weather, and/or other sensors that may include or provide a signal or indication of an environmental event.

A sound emitter 341 may also be housed within the faceplate 302 and/or backplate (not illustrated), or have an aperture, housing, and/or void defined by the faceplate 302 and/or backplate (not illustrated). The sound emitter 341 can be coupled to the control circuit (not illustrated) and allow for a sound to be emitted continuously or intermittently from the outlet cover 300 for a specified amount of time, such as but not limited to, 10 seconds, 15 seconds, 30 seconds, 1 minute, 3 minutes, 5 minutes, 10 minutes, 15 minutes, and/or 30 minutes after a power failure has occurred and the power has not been restored.

In one embodiment of the present disclosure, the outlet cover 300 may have a front surface 338 that may comprise a first angled section 324, a top angled section 326, a second angled section 328, a bottom angled section 330, a top flat section 332, a bottom flat section 334, or a middle flat section 336. The angled sections 324, 326, 328, and/or 330 may in one embodiment of the present disclosure, provide an outer boundary of the faceplate 302. Wherein the flat sections 332, 334, and/or 336 can provide an area for the outlet opening(s) 310. It would be understood that in alternative embodiments the angled sections may also be rounded, flat, and/or squared, or any other decorative profile and/or shape, while the flat surfaces may in alternative embodiments can be angled, rounded, textured, or any other decorative profile and/or shape.

FIG. 4 is an illustration of an outlet cover 400 in a side view. The outlet cover 400 may have a faceplate 402 and/or a backplate 404. The faceplate 402 and the backplate 404 may be connected or coupled together through fasteners (not shown). The faceplate 402 and/or the backplate 404 may also define or provide for an outlet opening(s) 410A/410B. An arm 406 can be connected, affixed, and/or coupled to the faceplate 402 or the backplate 404. In alternative embodiments of the present disclosure, the arm 406 may be made, manufactured, or formed with the faceplate 402 or the backplate 404.

An electrical conductor 408 may be housed within, affixed, connected, or coupled with the arm 406. The electrical conductor 408 can be a rounded button or bump that can have any number of shapes or profiles that would allow it to touch, couple, and/or connect to a power source. The electrical conductor 408 may also have wires or other conductors coupled to it in order to couple or connect it to a control circuit 416 and/or a battery 418. The control circuit 416 can control the operational mode (or at least one operational mode) of the outlet cover 400 and/or the light source 414. The light source 414 may generate or emit light in any number of directions. In one embodiment the light source may generate light in a downward or 0 degree position 415A. While in other embodiments, the light might be generated in a horizontal or 90 degree position 415C or any number of angles or positions 415B in between such as, but not limited to, 30 or 45 degree positions. The positions are referred to and/or relative to a downward position, with the angle be extended in a rotational arc upward and forward (front side) of the outlet cover 400. For example, if the outlet cover is placed in an electrical outlet, with the light source on the bottom side of the outlet cover (i.e., the light source is facing the floor) then the light in these various positions could light the baseboards in the downward position, to the opposite side of a hallway or room in the horizontal position. The operational modes (or at least two operational modes) can include, but are not limited to, a nightlight mode and/or an emergency light mode. The operational modes may be switched and/or added together by a switch 440.

In one embodiment of the present disclosure, the outlet cover 400 may be in the nightlight operational mode, allowing a light source 414 to generate light based on a sensor indicating when the room or location is no longer sufficiently lighted. The nightlight mode may also include the emergency lighting mode in alternative embodiments or may be used exclusively without the emergency lighting mode. The emergency lighting mode may be activated when there is no power or energy provided to the control circuit 416 by the electrical conductor(s) 408. The operational modes may be used exclusively or in combination.

FIG. 5 is an illustration of a light source 516. The light source may be connected, coupled, and/or affixed to an outlet cover (not shown). In one embodiment of the present disclosure, the light source 516 may be clipped via clip 542A and/or clip 542B within the light emitting device. The light source 516 can also have at least one light bulb, wherein the light bulb is illustrated as light bulb 544A, light bulb 544B, and/or light bulb 544C (collectively light bulbs 544). It would be understood that these light bulbs may include any number of light emitting sources, including, but not limited to LEDs, OLEDs, and other types or forms of bulbs, or any combinations thereof. For example, the at least one light bulb, may be an at least one LED. These light bulbs may also be set at various angles to produce varying degrees, and/or distributions of light. In an alternative embodiment of the present disclosure, each of the light bulbs may be set at a different angle, e.g., light bulb 544A may be set at a downward or 0 degree position, while light bulb 544B is set at a 30 degree position, and/or light bulb 544C is set at a 45 degree position. In another alternative embodiment, the light bulbs may each have varying degrees of light distribution based on their construction or manufacturer. For example, light bulbs 544A and/or 544C may have a 15 degree light distribution angle, while light bulb 544B has a light distribution angle of 30 degrees allowing for a broader or more expansive light distribution. In another embodiment, a lens 546 may also be utilized to control, and/or vary the light distribution of light bulbs 544, while it would be understood that the lens 546 may also be split, sectioned, and/or have portions that may vary the light distribution of each individual light bulb.

FIG. 6A is an illustration of an alternative outlet cover 600A in rear perspective view. The outlet cover 600A may have a faceplate 602 and/or a backplate 604. The faceplate 602 and backplate 604 may be attached, connected, and/or coupled together via a fastener. The faceplate 602 and/or backplate 604 may allow for, provide, and/or define a switch opening 650 to allow for a light switch, such as, but not limited to a flip or toggle switch, or a single pole, or double pole switch.

The faceplate 602 and/or backplate 604 may have a first arm 652 or a second arm 654 attached, coupled, connected, and/or affixed to them. In one embodiment of the present disclosure, the first arm 652 may touch and/or couple with one electrical conductor or power source nodes via an electrical conductor (not shown). Similarly, the second arm 654 may touch and/or couple with one electrical conductor or power source nodes via an electrical conductor (not shown).

FIG. 6B is an illustration of an alternative outlet cover 600B in rear perspective view. The outlet cover 600B may have a faceplate 602 and/or a backplate 604. The faceplate 602 and backplate 604 may be attached, connected, and/or coupled together via a fastener. The faceplate 602 and/or backplate 604 may allow for, provide, and/or define a switch or outlet opening 660 to allow for a light switch, such as, but not limited to a rocker switch, a switch and/or sensor, a flip or toggle switch, or a single or double pole switch.

The faceplate 602 and/or backplate 604 may have a first arm 662 or a second arm 664 attached, coupled, connected, and/or affixed to them. In one embodiment of the present disclosure, the first arm 662 may touch and/or couple with one electrical conductor or power source nodes via an electrical conductor (not shown). Similarly, the second arm 664 may touch and/or couple with one electrical conductor or power source nodes via an electrical conductor (not shown).

Figure 7:
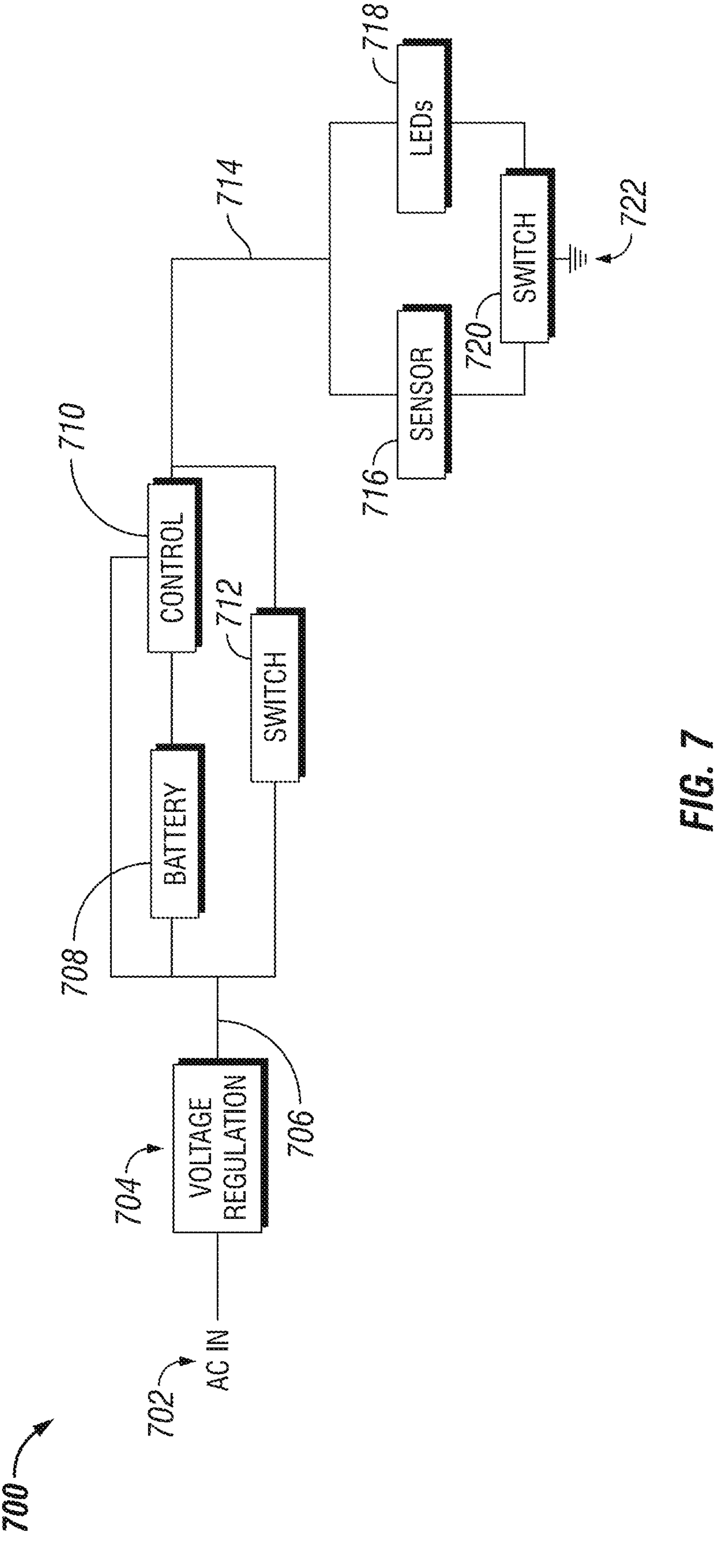
FIG. 7 is an illustration block diagram view of a light emitting device.

FIG. 7 is an illustration block diagram view of an outlet cover system 700. The outlet cover system 700 may have an incoming voltage source 702 that can in one embodiment of the present disclosure be an Alternating Current or AC voltage source. In one embodiment of the present disclosure, the incoming voltage source 702 may be received by an at least one conductor (not shown). The incoming voltage source 702 may be regulated and/or converted to a DC operating voltage by a voltage regulation circuit 704 to regulate the incoming voltage from the incoming voltage source 702. The output of the voltage regulation circuit 704 can be a regulated voltage 706. The regulated voltage can be, but is not limited to, sent to a battery 708, a control circuit 710, and/or a switch 712. The battery 708 can in alternative embodiments of the present disclosure be coupled and/or connected to a battery charging circuit that may utilize the regulated voltage 706. The control circuit 710 can allow the outlet cover system 700 to provide a light source during a power outage by activating the battery and/or opening a connection or coupling between the light source and the battery 708. The control circuit 710 may in one embodiment of the present disclosure also include the switch 712.

The switch 712 allows the battery and/or control circuit 710 to be bypassed and the regulated voltage to be passed to the input voltage node 714. The switch 712 may allow for the controlling a connection between the light source 718, the battery 708, and the regulated voltage 706. The input voltage node 714 may provide a voltage to a sensor 716 and/or a light source 718. The sensor 716 can be connected to a switch 720 that may be connected to the light source 718 with all of these being coupled to a ground 722. The sensor 716 may include, but is not limited to, a light sensor, a photo resistor, a photodiode, and/or a phototransistor.

It would be understood that a ground 722 can be placed within the circuit at any number of points and could also be illustrated by more than one ground. The switch 712 may prevent a current from passing through the light source 718 when a sufficient level of light is detected within the room or environment that the outlet cover system is placed in. For example, when utilized in a nightlight operational mode, the sensor 716 may prevent the light source from operating if an additional light and/or enough sunlight has entered the room. Alternatively, in an emergency lighting operational mode the sensor 716 may be utilized to conserve the battery 708 and allow for the light source to be utilized for the maximum number of days, hours, and/or minutes. In alternative embodiments of the present disclosure, the battery and/or control circuit may be considered an emergency lighting circuit, while the switch 712 and/or the sensor 716 may be considered a nightlight circuit.

Figure 8A:
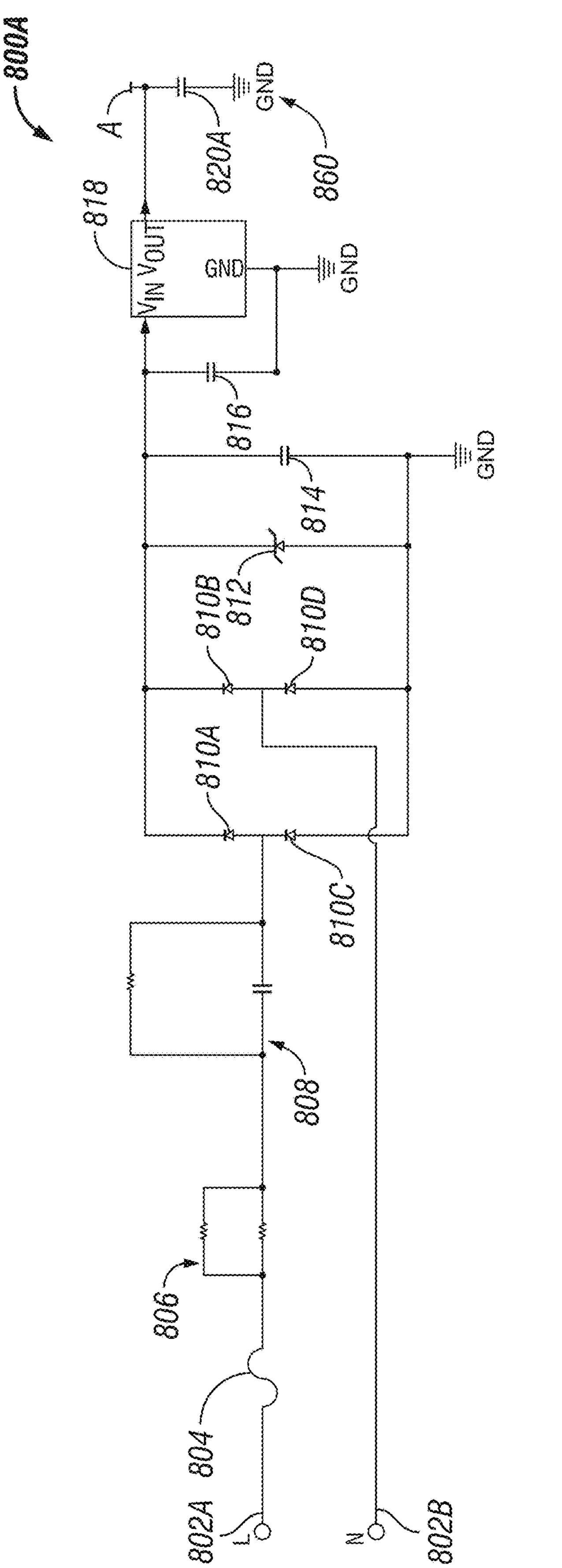
FIG. 8A is an illustration of a schematic for a portion of a light emitting device.

FIG. 8A is an illustration of a schematic for a portion of an outlet cover system 800A. The outlet cover system may have a high-power source input 802A and a low power source input 802B, it would be understood that in alternative embodiments the low power source input 802B may also be considered a ground 860. However, in alternative embodiments it may be the neutral, or a second "hot" line of an AC voltage. The high power source input 802A may be coupled to a fuse 804. The fuse 804 would be of a sufficient size to prevent an overcurrent, and/or an overvoltage from occurring within the circuit.

Coupled to the fuse 804 may be a resistance 806, and the resistance may have at least one resistor, or may have a combination of resistors in series and/or parallel to create a specific desired resistance value. The resistance 806 may be coupled with a resistance and/or capacitor, and/or RC block 808. It would be understood that the R in RC would stand for resistance or a resistor, and the C would stand for capacitance or a capacitor. The resistance and capacitance while illustrated in a parallel configuration, could be in a series, and a combination of series and parallel to create the desired resistance and capacitance combination.

The RC block 808 may be coupled between diode 810A and/or diode 810C, while the low power source input 802B may be coupled between diodes 810B and/or diode 810D. It would be understood that diodes 810A, 810B, 810C, and/or 810D collectively would be a bridge rectifier 810. The bridge rectifier 810 may be utilized to convert an AC voltage to a DC voltage. The output of the bridge rectifier 810 may include a diode 812, which can in one embodiment of the present disclosure be a Zener diode, and/or a capacitor 814 that may be in a series, parallel configuration, or a combination thereof. A voltage regulator 818 may be utilized to maintain a specific voltage, and/or condition the DC voltage from the bridge rectifier. A capacitor 816 can be utilized to smooth or remove transients from the input of the voltage regulator 818 by coupling the input of the voltage regulator 818 to ground via the capacitor 816. Similarly, a capacitor 820A can be utilized to smooth or remove transients from the output of the voltage regulator 818 by coupling the output of the voltage regulator 818 to ground via the capacitor 820A. The node A may be used as a reference to connections or nodes throughout the circuit that may have the same voltage or current as node A.

Figure 8B:
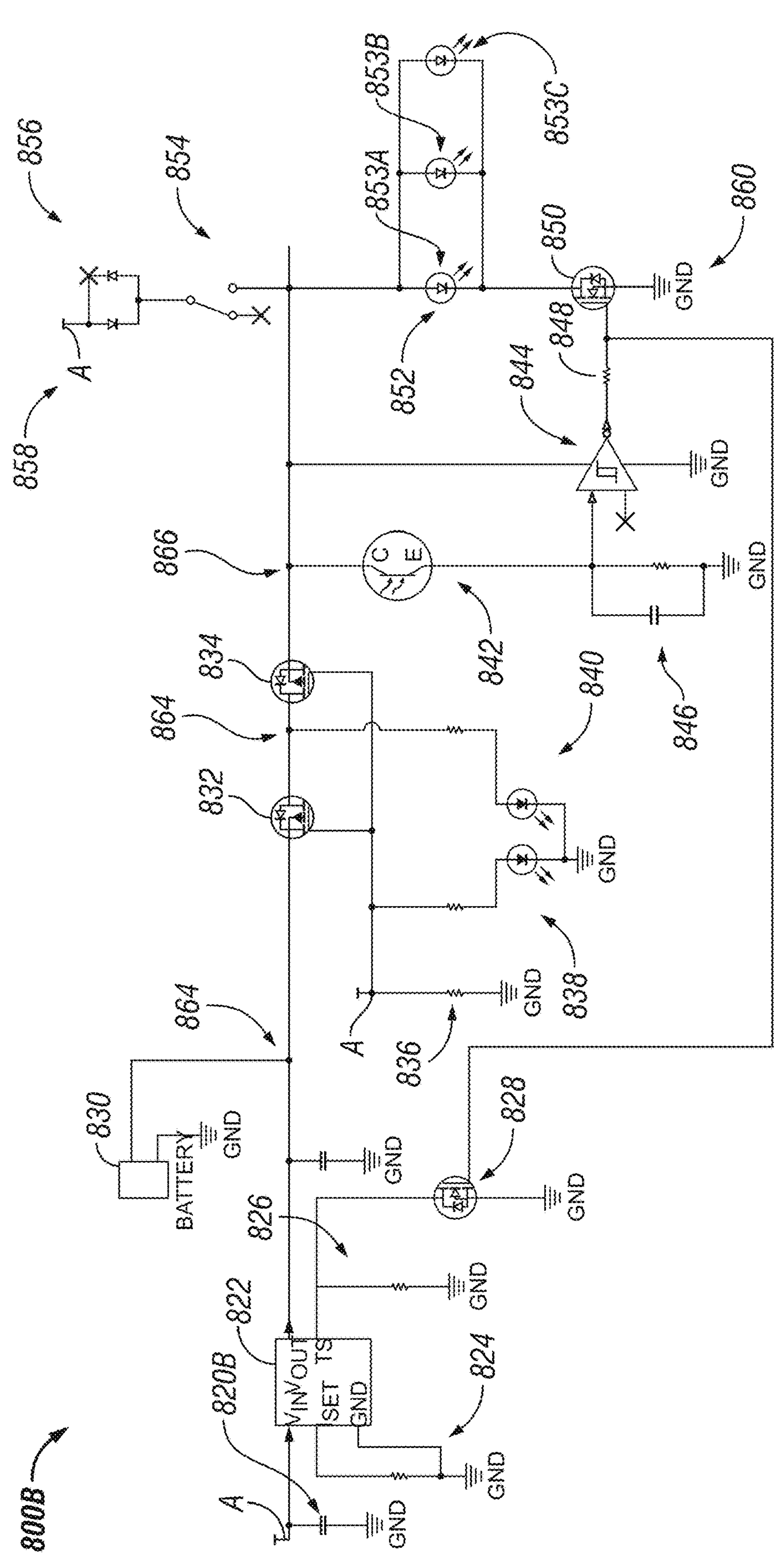
FIG. 8B is an illustration of a schematic for a portion of a light emitting device.

FIG. 8B is an illustration of a schematic for a portion of an outlet cover system 800B. The portion of the outlet cover system 800B illustrated in FIG. 8B is connected and/or coupled to the portion of the outlet cover system 800A illustrated in FIG. 8A by node A. It would be understood that these portions may be one circuit, and/or multiple circuits coupled together.

Node A is coupled to a battery charger 822 that may receive the regulated voltage at its voltage input terminal. The output voltage of the battery charger 822 may run to a battery 830, or at least one battery, as more than one battery may be utilized in alternative embodiments of the present disclosure. The battery charger 822 may have additional inputs and/or outputs. These inputs and outputs may be connected or coupled to ground via resistance 824, resistance 826, and/or capacitors 820B. The output of the battery charger 822, while connected or coupled to the battery 830, the output may also be coupled or connected to a transistor 832. A second transistor 834 may also be coupled directly or indirectly to the output of the battery charger 822.

The transistor 832 may be coupled to the output of the battery charger 822, Node A, and/or transistor 834. The transistor 832 is configured to prevent additional voltage and/or current from being connected or coupled to the battery 830 at node 868, while it may also allow for the battery 830 to be connected or coupled to a light source. The transistor 834 allows for a current and/or voltage to sense or seen at the sensing node 864 that can be between the transistors 832/834. A first diode 838 may be coupled to node A, while a second diode 840 may be coupled to the sensing node 864. The first diode 838 and the second diode 840 may in one embodiment of the present disclosure be a Light Emitting Diodes or LEDs; however, other light emitting elements may also be substituted. The first diode 838 may provide an indication when the outlet cover system 800A/800B is connected and/or coupled to a power source or an AC voltage. The second diode 840 may provide an indication of when the battery is being utilized in the event of a power failure.

The transistor 834 can be coupled to a sensor 842, a switch 854, and/or a light source 852 at a node 866. The sensor 842 can be a light sensor, a photo resistor, a photodiode, a phototransistor, or other forms of light detecting sensors. The sensor 842 may provide for the detection of light, and/or allow current to pass through as light may be sensed by the sensor. The sensor 842 may be coupled to a comparator 844 and/or a RC block 846. The RC block 846 may be utilized to smooth or limit the amount of current and/or voltage on an input node of the comparator 844. The comparator 844 may have at least two inputs, and at least one output. The first input may be coupled to the sensor 842; the second input may be left floating or have a null value coupled to it, and the output may be coupled to a transistor 828, a transistor 850, and/or a resistance 848. The output of the comparator may trigger when the sensor 842 indicates that it no longer senses sufficient light within the local environment, while alternatively the comparator may also trigger when the sensor 842 indicates that it sense sufficient light within the local environment. The output of the comparator 844 may cause the transistor 850 to couple the light source 852 to ground, and thus allowing current to pass through the light source 852.

The light source 852 may be comprised of at least one light bulb, wherein the at least one light bulb may be a Light Emitting Diode or LED, or an Organic LED or OLED. In one embodiment of the present disclosure, the light source 852 may be comprised of light bulb 853A, light bulb 853B, and/or light bulb 853C. The light source 852 may be coupled to the transistor 850, a switch 854, the sensor 842, and/or the transistor 834. The switch 854 may allow the regulated voltage to be coupled directly or indirectly to the light source 852. The switch 854 may be a physical switch that a user may move to indicate whether the switch connects or disconnects the regulated voltage from the light source. When the switch is in a disconnected position, the outlet cover system 800A/800B may be in an emergency lighting operational mode, wherein the outlet cover system 800A/800B can utilize an emergency light circuit that may comprise, but is not limited to, the battery 830, the transistor 832/834, and the light source 852. When the switch 854 is in the connected state, the outlet cover system 800A/800B may operate in a nightlight operational mode wherein the outlet cover system 800A/800B can nightlight circuit that may include, but is not limited to, the sensor 842, the comparator 844, and the light source 852.

The switch may be coupled to a diode block 856 that may be utilized to prevent voltage and/or current from being seen on the regulated voltage output of the voltage regulator (not shown). The battery charger 822 may have an input connected or coupled to a resistance 826 and/or a transistor 828. In one embodiment of the present disclosure, the transistor 828 can be coupled to the output of the comparator 844. Node A may also be referenced as node A 858.

Figures 9A, 9B:
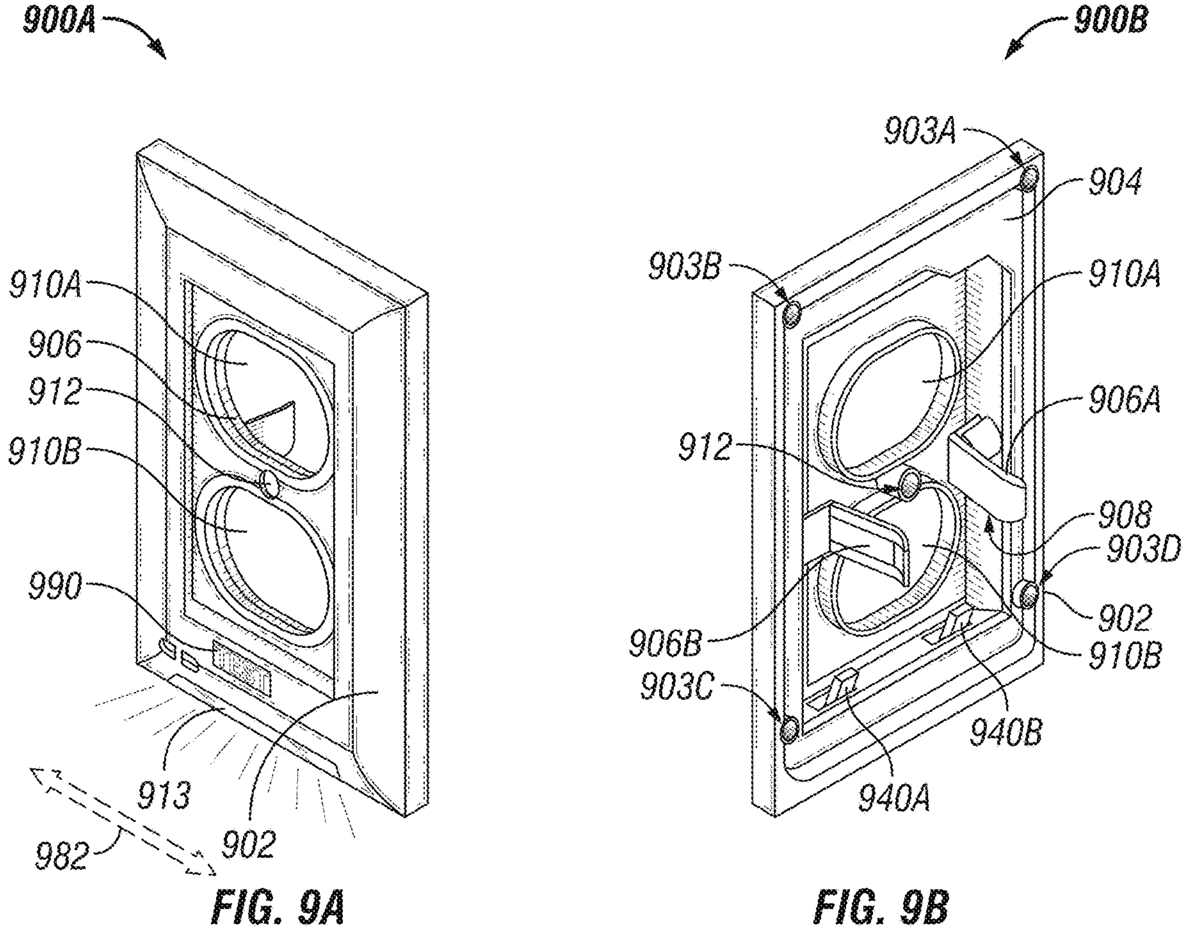
FIG. 9A is an illustration of a front perspective view of an outlet cover with a directional indicator.
FIG. 9B is an illustration of a rear perspective view of an outlet cover with a directional indicator.

FIG. 9A is an illustration of an outlet cover 900A with a directional indicator 982. The outlet cover 900A can have a faceplate 902. The faceplate 902 can define outlet openings 910A and/or 910B (collectively 910). In some embodiments, the outlet openings 910 may also include switch openings, dimmer openings, USB outlet openings, audio connector openings, video connector openings, and/or other openings defined by the faceplate 902 that would allow for a cable and/or connector to pass through the faceplate. The outlet cover 900A may also have an arm 906. In at least one embodiment, the arm 906 incudes a conductor housed within it that allows for the coupling of the outlet cover 900A with an electrical system (not illustrated). The electrical system may be a house and/or building electrical system that may include AC and/or DC voltage or currents. The outlet cover 900A may be coupled to an electrical outlet (not illustrated) through a fastener (not illustrated) and a fastener opening 912.

In at least one embodiment, the outlet cover 900A has a light source 913. The light source 913 may include at least one Light Emitting Diode (LED). In some embodiments, the light source 913 may also have a directional indicator 982. The directional indicator 982 may include arrows indicating a direction to the right or left of an axis traversing the outlet openings 910 and/or to the right or left of the outlet cover 900A. The directional indicator 982 may be dual directional and/or indicating that both directions can be utilized for an exit, or the directional indicator 982 may include a single direction as selected by a user before the outlet cover 900A is installed. In at least one example, the outlet cover 900A may have a test button 990. The test button 990 can also include a test circuit (not illustrated) to allow for testing a power source coupled to the outlet cover 900A, such as an AC power source or a battery. The test button 990 may be coupled to a power source, and/or a battery.

FIG. 9B is an illustration of a rear perspective view of an outlet cover 900B. The outlet cover 900B includes a backplate 904. While the backplate 904 may be molded, glued and/or secured to the faceplate (not illustrated), it may also be secured with fastener(s) 903A, 903B, 903C, and/or 903D (collectively 903). In some embodiments, one fastener may be utilized, while in other embodiments more than one fastener 903 may be utilized. The backplate 904 may define an outlet opening 910A and an outlet opening 910B (collectively 910). The outlet opening(s) 910 may also be switch openings, cable connector openings, audio/video connector openings, and/or other openings for various connectors and/or objects. The outlet cover 900B may also be fastened to an outlet device (not illustrated) with a fastener (not illustrated) through a fastener opening 912 that is defined by the outlet cover 900B. The outlet cover 900B can have arm(s) 906A and/or 906B (collectively 906) that extend rearward from the backplate 904.

The outlet cover 900B can also have a first switch 940A and a second switch 940B. In at least one embodiment, the first switch 940A can be utilized to know which operational mode the outlet cover 900B is operating in. For example, the outlet cover 900B may operate in a nightlight mode that turns the light on when the light level in the room and/or location of the outlet cover 900B drops below a threshold, and an emergency lighting mode that turns on when there is no power detected at the outlet device and the light level drops below a threshold. The second switch 940B can indicate which direction a directional indicator (not illustrated) may indicate. For example, the switch 940B may be in a right or first position that indicates that a right arrow will be indicated, a second or neutral position for indicating that both directions will be indicated and a third position or left position to indicate that a left arrow will be indicated. It would be understood that these directions are for illustrative purposes and a right position may indicate a left arrow, and a left position may indicate a right arrow.

Figure 10:
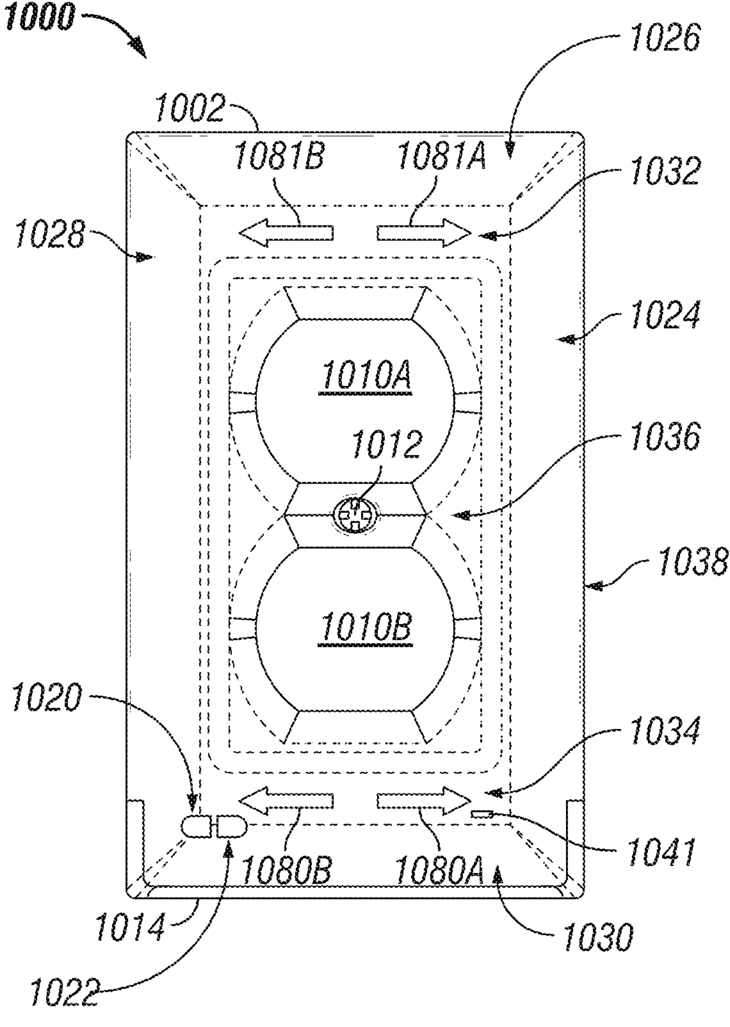
FIG. 10 is an illustration of a front view of an outlet cover with directional indicators.

FIG. 10 is an illustration of a front view of an outlet cover 1000. The outlet cover 1000 can include a faceplate 1002. The faceplate 1002 can have angled sections 1024, 1026, 1028, and/or 1030. The angled sections 1024, 1026, 1028, and/or 1030 can provide support, and a housing for the light source 1014, indicator 1020, sensor 1022, and/or other additional circuitry. The outlet cover 1000 can also have flat sections 1032 and/or 1034 that can provide support, and a housing for directional indicators 1081A and/or 1081B (collectively 1081) and/or directional indicators 1082A and/or 1082B (collectively 1082).

The angled sections and the flat sections can also define the outlet openings 1010A and/or 1010B. In at least one example, the outlet cover 1000 can be secured with a fastener (not illustrated) through fastener opening 1012. The outlet cover 1000 may also have an indicator 1020 that allows a user to know when the outlet cover 1000 is connected to an electrical power source. For example, the indicator may turn green when the outlet cover 1000 is connected to power, but may turn red or off when the outlet cover 1000 is not connected to power or there is a power outage. The outlet cover 1000 may also have a sensor 1022 for detecting the ambient light. For example, if the light in a room exceeds a threshold level as recorded and/or sensed by the sensor 1022 then the light source 1014 may be turned off. Alternatively, if the light in a room or location drops below a threshold level as recorded and/or sensed by the sensor 1022, then the light source 1014 may be turned on. In at least one embodiment, when the light source 1014 is turned on one or more of the directional indicator(s) 1080, and/or 1081 may also be activated. In another example, the sensor 1022 may also include an environmental quality sensor such as a smoke or air quality sensor that when triggered (the air quality is below a threshold value, or when a smoke sensor detects smoke above a threads hold value) then both directional indicator 1080 and 1081 will turn on. It should be noted that a user (not illustrated) may select a single direction, right directional indicator 1080A and/or 1081A, a left directional indicator 1080B and/or 1081B, or both directions directional indicators 1080A, 1080B, 1081A, and 1081B. The outlet cover 1000 may also have a sound emitter 1041 capable of producing an audible alarm or sound to indicate when there is a power outage, or if there is an environmental condition that a user (not illustrated) should be notified about. For example, when a fire and/or smoke is detected.

Figure 11:
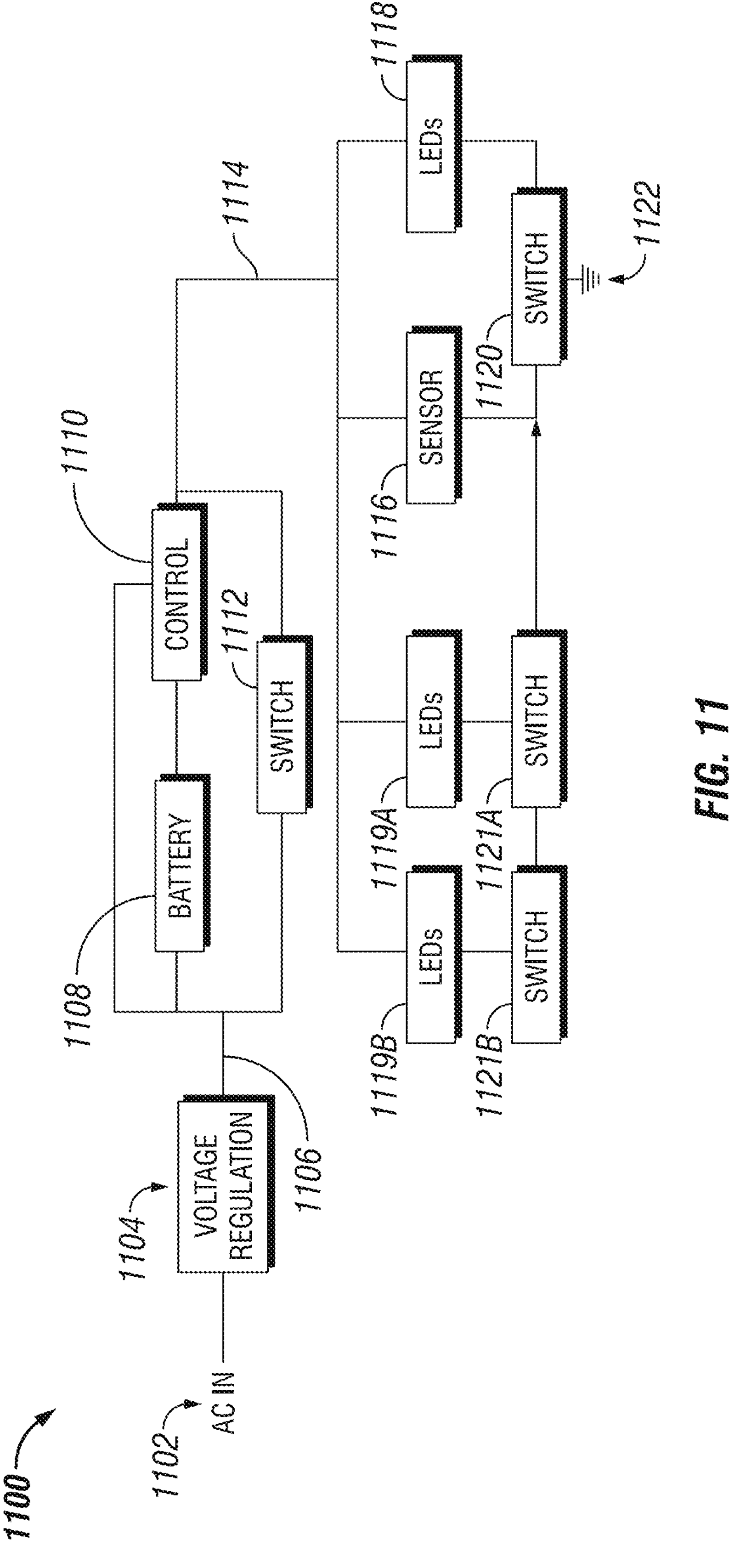
FIG. 11 is an illustration of a block diagram view of an outlet cover system.

FIG. 11 is an illustration of a block diagram view of an outlet cover system 1100. The outlet cover system 1100 may have an incoming voltage source 1102 that can in one embodiment be an Alternating Current, or AC, voltage source. In another embodiment, the incoming voltage source 1102 may be received by an at least one conductor (not shown). The incoming voltage source 1102, may be regulated and/or converted to a DC operating voltage by a voltage regulation circuit 1104 to regulate the incoming voltage from the incoming voltage source 1102. The output of the voltage regulation circuit 1102 can be a regulated voltage 1106, the regulated voltage can be, but is not limited to, sent to a battery 1108, a control circuit 1110, and/or a switch 1112. The battery 1108, can in alternative embodiments be coupled and/or connected to a battery charging circuit that may utilize the regulated voltage 1106. The control circuit 1110 can allow the outlet cover system 1110 to provide a light source during a power outage by activating the battery, and/or opening a connection or coupling between a light source and the battery 1108. The control circuit 1110 may in one embodiment also include the switch 1112.

The switch 1112 allows the battery and/or control circuit 1110 to be bypassed and the regulated voltage to be passed to the input voltage node 1114. The switch 1112 may allow for the controlling a connection between the light source 1118, the battery 1108, and the regulated voltage 1106. The input voltage node 1114 may provide a voltage to a sensor 1116, and/or a light source 1118. The sensor 1116 can be connected to a switch 1120 that may be connected to the light source 1118, with all of these being coupled to a ground 1122. The sensor 1116 may include, but is not limited to, a light sensor, a photo resistor, a photodiode, and/or a phototransistor. The sensors 1116 may activate the switch 1120, allowing the light source 1118 to be activated. Directional indicator(s) 1119A and/or 1119B (collectively 1119) may also be coupled to the switch 1120. In at least one embodiment, the directional indicator(s) 1119A and/or 1119B are light sources, and/or Light Emitting Diodes (LEDs). However, other light sources may also be utilized. The directional indicator 1119A may in at least one example, be a right directional indicator, and indicator 1119B can in at least one example, be a left directional indicator. The directional indicators 1119 may be controlled and/or activated by a switch 1121A and/or 1121B (collectively 1121). In at least one embodiment, the directional indicators 1119 may be controlled by a single switch 1121. The single switch may allow for the directional indicator(s) 1119 to be selected as a right only, left only, or both directional indicators.

Figure 12:
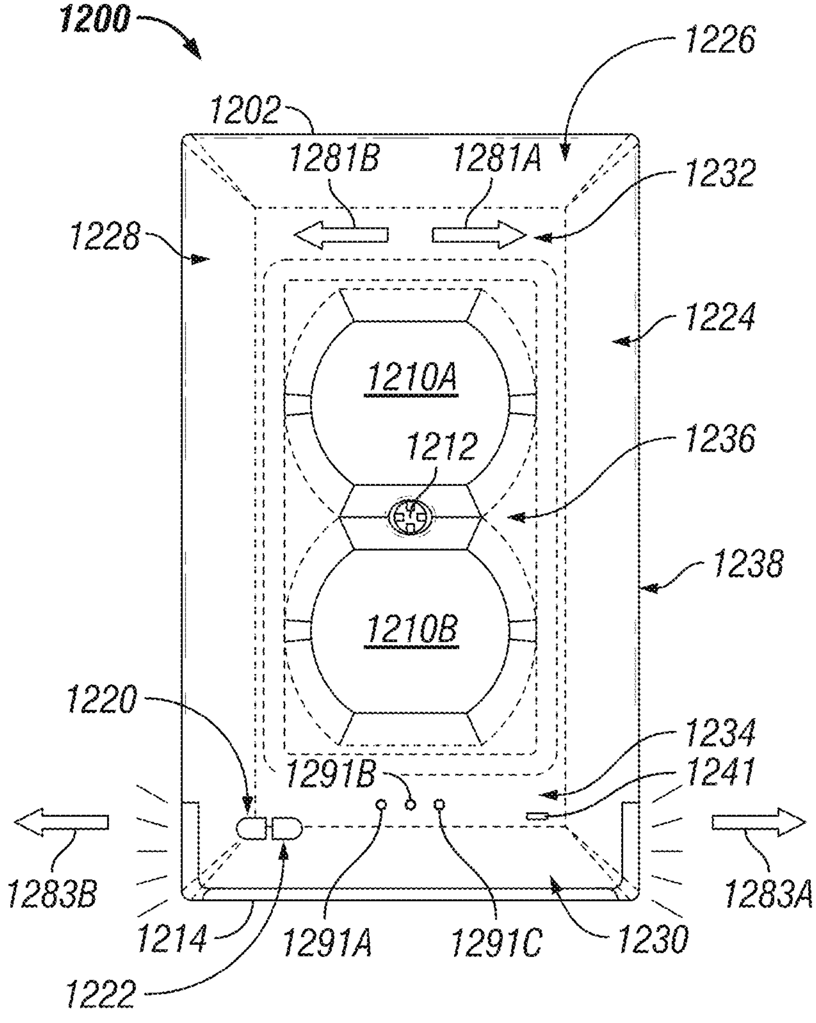
FIG. 12 is an illustration of a front view of an outlet cover with directional indicators.

FIG. 12 is a front view illustration of an outlet cover 1200. The outlet cover 1200 can include a faceplate 1202. The faceplate 1202 can have angled sections 1224, 1226, 1228, and/or 1230. The angled sections 1224, 1226, 1228, and/or 1230 can provide support, and a housing for the light source 1214, indicator 1220, sensor 1222, and/or other additional circuitry. The outlet cover 1200 can also have flat sections 1232 and/or 1234 that can provide support, and a housing for directional indicators 1281A and/or 1281B (collectively 1281) and/or directional indicators 1282A and/or 1282B (collectively 1282). The light source 1214 may include Light Emitting Diode(s) (LED) or other light sources capable of receiving power and/or electrical energy and converting it into a visible wavelength of light. The light source 1214 may extend along the bottom of the outlet cover 1200 and extend along both sides of the outlet cover. The portion of the light source 1214 that extends along the side may emit on a wall (not illustrated) a side directional indicator 1283A and/or 1283B. Each of the side directional indicator 1283A and/or 1283B may be used individually or together and be activated by a switch or directional control switch (not illustrated). In at least one example, the outlet cover 1200 may also have test apparatus 1291A, 1291B, and/or 1291C (collectively 1291) defined by one or more of said flat sections or angled sections. The test apertures 1291 can allow for a testing device (not illustrated) to be utilized for verifying the strength of a power source coupled to the outlet cover 1200.

The angled sections and the flat sections can also define the outlet openings 1210A and/or 1210B. In at least one example, the outlet cover 1200 can be secured with a fastener (not illustrated) through fastener opening 1212. The outlet cover 1200 may also have an indicator 1020 that allows a user to know when the outlet cover 1200 is connected to an electrical power source. For example, the indicator may turn green when the outlet cover 1200 is connected to power, but may turn red or off when the outlet cover 1200 is not connected to power or there is a power outage. The outlet cover 1200 may also have a sensor 1222 for detecting the ambient light. For example, if the light in a room exceeds a threshold level as recorded and/or sensed by the sensor 1222 then the light source 1214 may be turned off. Alternatively, if the light in a room or location drops below a threshold level as recorded and/or sensed by the sensor 1222, then the light source 1214 may be turned on.

In at least one embodiment, when the light source 1214 is turned on one or more of the directional indicator(s) 1280 and/or 1281 may also be activated. In another example, the sensor 1222 may also include an environmental quality sensor such as a smoke or air quality sensor that when triggered (the air quality is below a threshold value, or when a smoke sensor detects smoke above a threshold value) may activate both directional indicator. 1280 and. It should be noted that a user (not illustrated) may select a single direction, right directional indicator 1280A and/or 1281A, a left directional indicator 1280B and/or 1281B, or both directions directional indicators 1280A, 1280B, 1281A, and 1281B. The outlet cover 1200 may also have a sound emitter 1241 capable of producing an audible alarm or sound to indicate when there is a power outage or if there is an environmental condition that a user (not illustrated) should be notified about, for example, when a fire and/or smoke is detected. In at least one example, the directional indicator(s) 1281 and/or 1283, light source 1214, indicator 1220 may be of various colors in the visible light spectrum. For example, the light source 1214 may provide a light output that is the color white, while the directional indicator(s) 1281 and/or 1283 may be red or white.

Figure 13A:
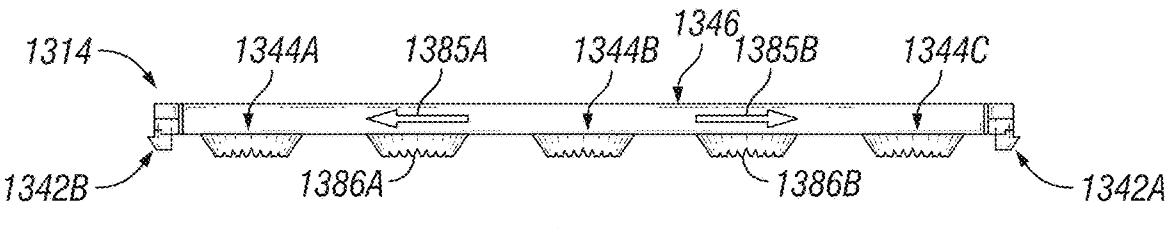
FIG. 13A is an illustration of a light source for an outlet cover.

FIG. 13A is an illustration of a light source 1314 for an outlet cover. The light source 1314 can have light bulb(s) 1344A, 1344B, and/or 1344C that allow for light to be passed through a lens 1346. In at least one example, the light bulb(s) 1344A, 1344B, and/or 1344C are Light Emitting Diode(s) (LEDs). The light source 1314 may also have indicator light bulb(s) 1386A and/or 1386B. The indicator light bulb(s) may pass through an arrow lens 1385A and/or 1385B. The one or both of the indicator light bulb(s) 1386 and arrow lens(es) 1382 may be utilized to signal a user in a specific direction in the event of a power outage or other event. The light source 1314 may also have clip(s) 1342A and/or 1342B that allow for the light source to be secured to and/or within an outlet cover (not illustrated).

Figure 13B:
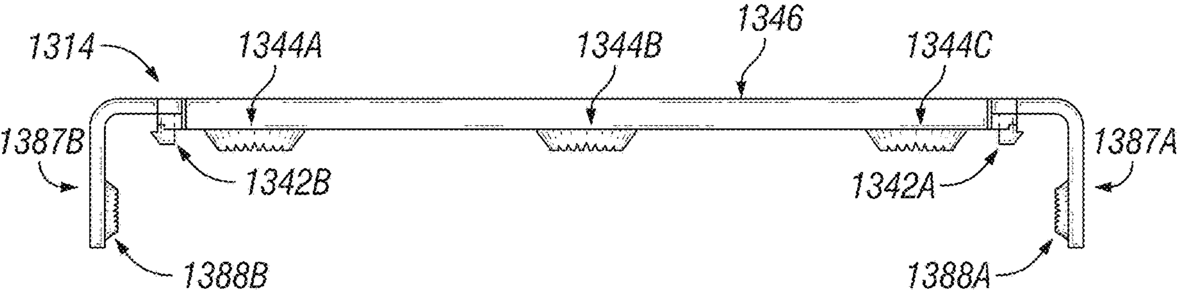
FIG. 13B is an illustration of a light source with extensions for an outlet cover.

FIG. 13B is an illustration of an extended light source 1314 for an outlet cover. The light source 1314 can have light bulb(s) 1344A, 1344B, and/or 1344C that allow for light to be passed through a lens 1346. In at least one example, the light bulb(s) 1344A, 1344B, and/or 1344C are Light Emitting Diode(s) (LEDs). The light source 1314 may also have indicator light bulb(s) 1388A and/or 1388B. The light source 1314 may have extensions 1387A and/or 1387B that allow the light source 1314 to extend along the sides of an outlet cover (not illustrated). The extensions 1387A and/or 1387B may also include the indicator light bulb(s) 1388A and/or 1388B (collectively 1388). In at least one example, the indicator light bulb(s) 1388 may be Light Emitting Diode(s) (LEDs) or other light emitting devices. The light source 1314 may also have clip(s) 1342A and/or 1342B that allow for the light source to be secured to and/or within an outlet cover (not illustrated).

Figure 14:
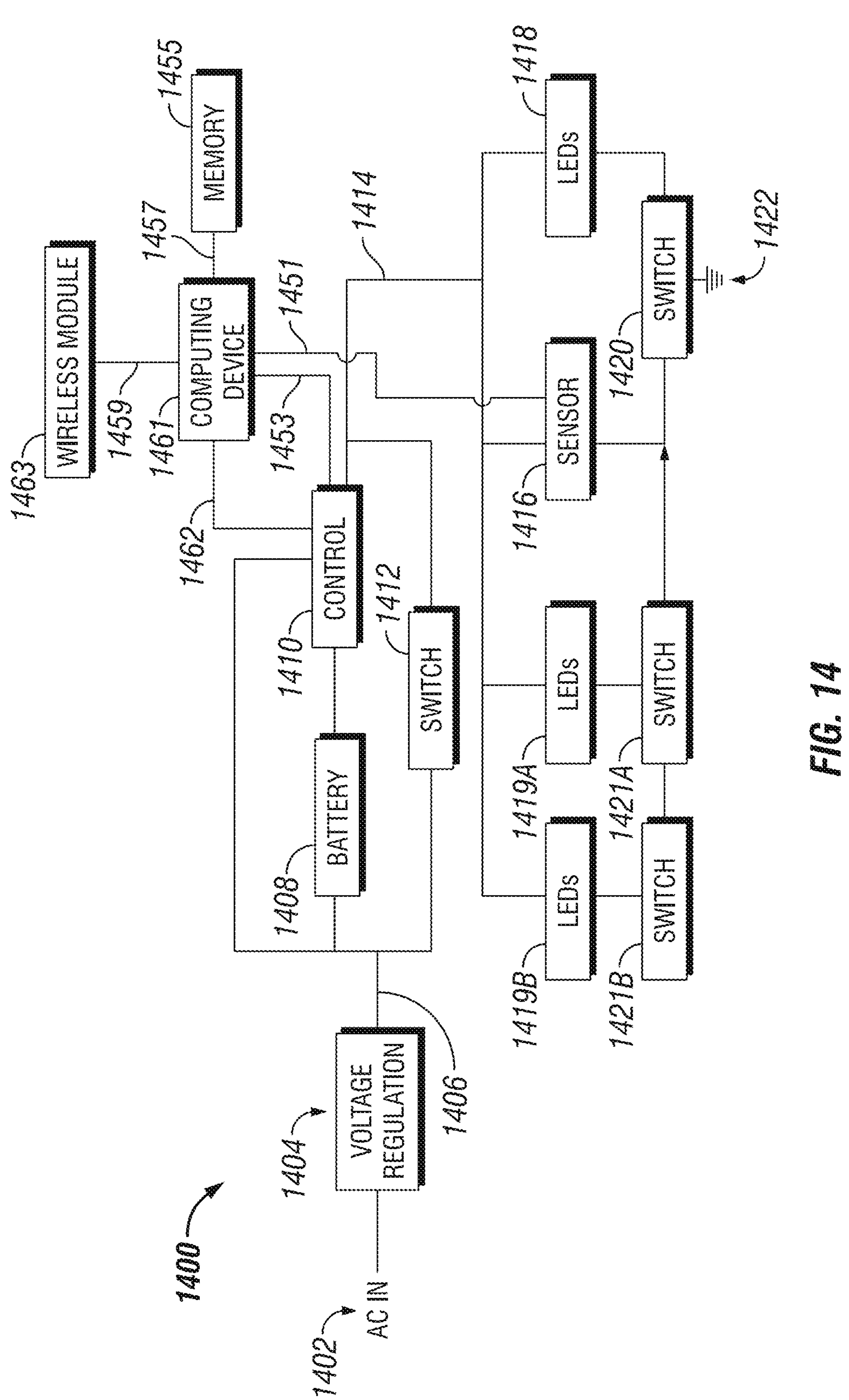
FIG. 14 is an illustration of a block diagram view of an outlet cover system featuring connectivity.

FIG. 14 an illustration of a block diagram view of an outlet cover system 1400 with connectivity. The outlet cover system 1400 can include portions of the outlet cover apparatuses and/or systems described in the figures above without limitation to those described in connection with FIGS. 1-13. The outlet cover system 1400 can allow for an outlet cover having a light source to be coupled to a security, emergency, or fire prevention system. In some examples, the outlet cover system 1440 may communicate alerts to the security, emergency, or fire prevention system, while in other examples, the outlet cover system 1400 receives alerts from the security, emergency, or fire prevention system.

The outlet cover system 1400 may have an incoming voltage source 1402 that can in one embodiment be an Alternating Current or AC voltage source. In another embodiment, the incoming voltage source 1402 may be received by an at least one conductor (not shown). The incoming voltage source 1402 may be regulated and/or converted to a DC operating voltage by a voltage regulation circuit 1404 to regulate the incoming voltage from the incoming voltage source 1402. The output of the voltage regulation circuit 1402 can be a regulated voltage 1406 the regulated voltage can be, but is not limited to, sent to a battery 1408, a control circuit 1410, and/or a switch 1412. The battery 1408 can in alternative embodiments be coupled and/or connected to a battery charging circuit that may utilize the regulated voltage 1406. The control circuit 1410 can allow the outlet cover system 1400 to provide a light source during a power outage by activating the battery, and/or opening a connection or coupling between a light source and the battery 1408. The control circuit 1410 may in one embodiment also include the switch 1412.

The switch 1412 allows the battery and/or control circuit 1410 to be bypassed and the regulated voltage to be passed to the input voltage node 1414. The switch 1412 may allow for the controlling of a connection between the light source 1418, the battery 1408, and the regulated voltage 1406. The input voltage node 1414 may provide a voltage to a sensor 1416 and/or a light source 1418. The sensor 1416 can be connected to a switch 1420 that may be connected to the light source 1418, with all of these being coupled to a ground 1422. The sensor 1416 may include, but is not limited to, a light sensor, a photo resistor, a photodiode, and/or a phototransistor. The sensors 1416 may activate the switch 1420 allowing the light source 1418 to be activated. Directional indicator(s) 1419A and/or 1419B (collectively 1419) may also be coupled to the switch 1420. In at least one embodiment, the directional indicator(s) 1419A and/or 1419B are light sources, and/or Light Emitting Diodes (LEDs). However, other light sources may also be utilized. The directional indicator 1419A may in at least one example, be a right directional indicator, and indicator 1419B can, in at least one example, be a left directional indicator. The directional indicators 1419 may be controlled and/or activated by a switch 1421A and/or 1421B (collectively 1421). In at least one embodiment, the directional indicators 1419 may be controlled by a single switch 1421. The single switch may allow for the directional indicator(s) 1419 to be selected as a right only, left only, or both directional indicators. Examples of a single switch may include multi-pole, multi-throw switches, allowing one or both light sources 1419A/1419B to be activated.

The control circuit 1410 may be connected with a computing device 1461 via an input 1462 and/or an output 1453. It would be understood that the input 1462 and/output 1453 may be a connection or coupling. The computing device 1461 may be able to send signals to and receiving signals from the control circuit 1410. In at least one example, the computing device 1461 may also include a connection to the sensor 1416 through a connection 1451. The computing device 1461 can then process information received through the various connection, in order to prepare and/or communicate alerts or notifications to a security, emergency, and/or fire prevention system.

Through a first connection 1459, the computing device 1461 may be connected to a wireless communication module 1463. A memory unit 1455 may also be connected with the computing device 1461 through a second connection 1457. In at least one embodiment, the wireless module 1463 may feature a Wi-Fi transmitter/receiver, or other wireless transceivers such as Bluetooth®, ZigBee® or other low power wireless transmission system that may be able to transmit and receive communications wirelessly. In some examples, the communications may be through digital transmission protocols, while other examples may include analog communication protocols. In some examples wireless module 1463 may incorporate a power line communications circuit and/or a wired communication circuit connected to the computing device 1461 so that signals may be sent and received by the computing device 1461 through wired connection coupled to the outlet cover system 1400.

Communications sent or received by wireless module 1463 may be sent to the computing device 1461 can be removed from or placed in in a memory unit 1455 via the second connection 1457. In at least one embodiment the memory unit 1455 can be capable of temporary and/or permeant storage, and/or other forms of computer-readable media or mediums. Data preloaded in the memory unit 1455 may also be retrieved from the memory unit 1455 by the computing device 1461 to properly transmit/receive data through the wireless module 1463 and/or provide processing of data, notification alerts, information, or combinations thereof. The memory unit 1455 may also allow for the storage of executable or computer readable code that provide instructions to the computing device 1461.

In at least one embodiment, the sensor 1116 may be connected to the computing device 1461 through a sensor connection 1451. The computing device 1461 can be configured to and capable of interfacing with the sensor 1416 and analyzing various types of data received from the sensor 1416. For example, the sensor 1416 may be capable of detecting the presence of harmful smoke, a lack of light, noise levels above or below a threshold, specific chemical signatures, moisture, temperature above or below a threshold, and/or other environmental conditions in the immediate vicinity of the outlet cover system 1400. The sensor 1416 may relay this information to the computing device 1461 which can analyze the data. The computing device 1461 may then retrieve the proper communications protocols or instructions, in at least one example stored in the memory unit 1455, and transmit data and/or instructions through the wireless module 1463 over a wireless or wired network (not shown) to a central server or base station (not shown) for further action. In at least one example, the transmission may also be made to a mobile or user device. In some examples, the central server or base station may issue an alarm, alert, and/or notification to a proper entity such as, but not limited to, a fire, police, EMS or other personnel, requesting further investigation of the area in the immediate vicinity of the outlet cover system 1400 that sent the signal. Other examples may also be able to connect, either directly or indirectly through intermediate networks or device, with an alarm, fire suppression system, and/or emergency alert system (not shown) capable of addressing the situation, such as but not limited to, initiating a fire suppression system to extinguish the source of smoke in a timely manner. The computing device 1461 may be able to receive data through wired or wireless connection from various types sensors or systems for detection, evaluating, and/or controlling various environmental conditions. The data received and/or analyzed by the computing device 1461 may include data received from, but not limited to, the following types of sensors: a smoke detector, carbon monoxide detector, light sensor, a photo resistor, a photodiode, a phototransistor, temperature sensor, moisture sensor, sound level sensor, and chemical signature sensor. However, the computing device 1461 is not limited to analyzing data from these types of sensors and can be configured to receive, analyze and transmit data from any sensor known by one of ordinary skill in the art.

Figure 15:
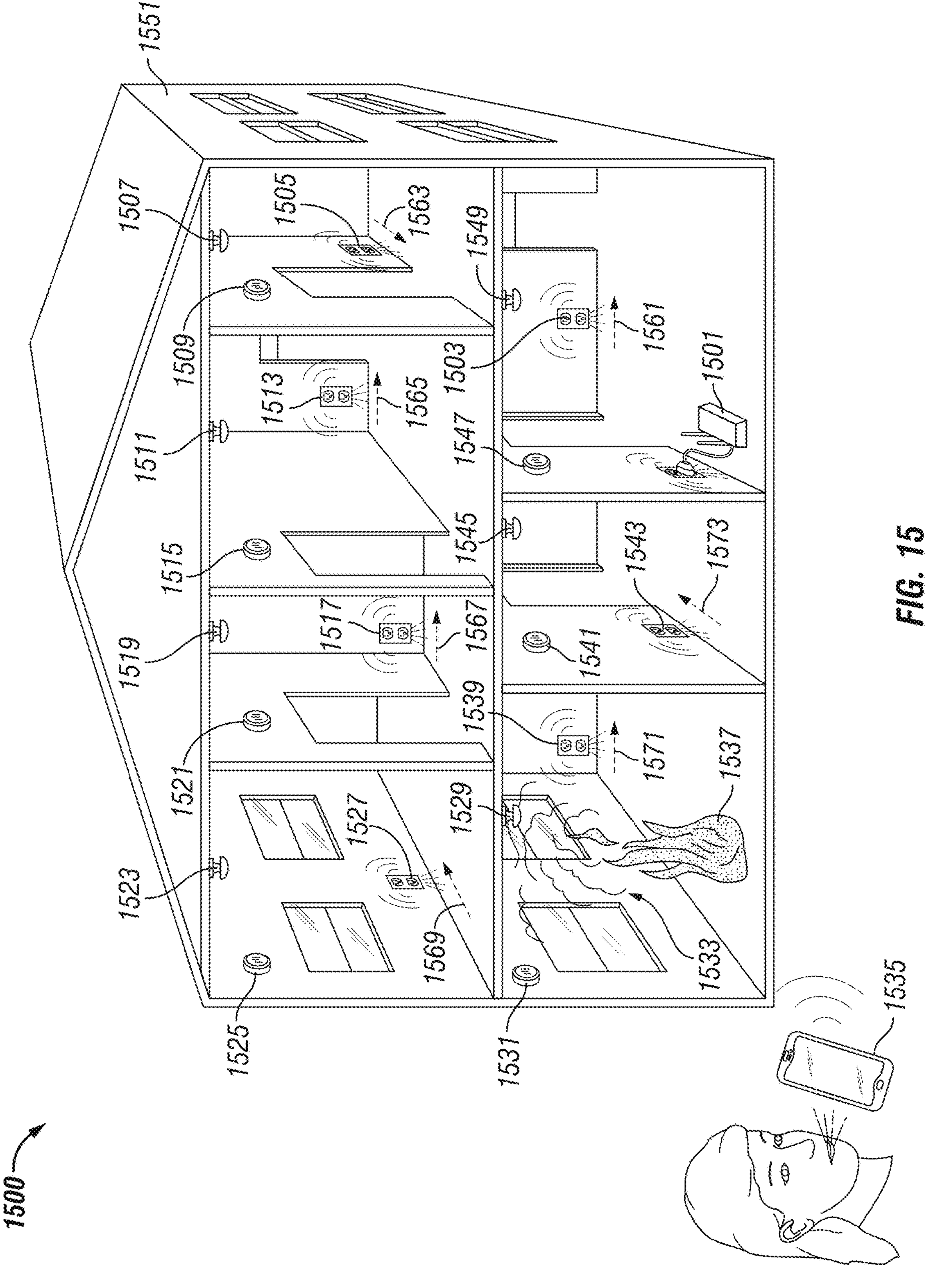
FIG. 15 is an illustration of an environmental view of an outlet cover system featuring connectivity and incorporated into a structure.

FIG. 15 is an illustration of an environmental view of an outlet cover system 1500 in use. An outlet cover system 1500 can be incorporated into a large structure 1551 such as a residence or a commercial building. The placement of each individual outlet cover of the outlet cover system 1500 could depend on the size, shape, and location of a room in the larger structure, as well as the location of doors and exits. By taking into account the dimensions of the various rooms in the large structure 1551 and the signal range of each of the individual outlet covers, the entire area, as well as every room, may be covered by an efficient number of individual outlet covers. By placing an outlet cover in signal range of at least one other outlet cover connected to a network, the outlet cover 1527 in a large structure 1551 may be able to communicate with a base station 1501 even if the outlet cover 1527 is not directly located within range of the base station 1501.

In at least one embodiment, the outlet cover system 1500 may include more than one outlet covers 1503, 1505, 1513, 1517, 1527, 1539, 1543 that can be connected through a wireless module incorporated within each outlet cover 1503, 1505, 1513, 1517, 1527, 1539, 1543 with other devices and/or systems for securing, monitoring, and/or alerting persons within the environment of problems or issues. In at least one example, the outlet covers 1503, 1505, 1513, 1517, 1527, 1539, 1543 can comprise a directional indicator or directional projection 1561, 1563, 1565, 1567, 1569, 1571, and/or 1573 to indicate a direction to the nearest exit. For example, the outlet covers 1503, 1505, 1513, 1517, 1527, 1539, and/or 1543 may have light or ambient light sensors that allow the outlet covers 1503, 1505, 1513, 1517, 1527, 1539, and/or 1543 to indicate a direction when the ambient light in room or environment is below a pre-defined threshold, because of smoke, power failure, and/or other environmental conditions.

An outlet cover 1503, 1505, 1513, 1517, 1527, 1539, and/or 1543 may feature a connectivity component capable of communicating directly and/or through intermediaries with a central hub, central servers, and/or a base station 1501. The outlet cover 1503, 1505, 1513, 1517, 1527, 1539, and/or 1543 may have a sensor incorporated into its structure capable of sensing the presence of and/or change in environmental conditions including but not limited to fire hazards, power outages, gas leaks, water leaks, etc. For example, the outlet cover 1539 may sense the presence of a fire hazards 1537 in its immediate vacuity that is emanating harmful airborne contaminates 1533, allowing the outlet cover 1539 to generate an alert regarding the presence of the fire hazard 1537.

Once the environmental change has been detected, the outlet cover 1539 may communicate to other electrical outlets 1503, 1505, 1513, 1517, 1527, and/or 1543, as well as a base station 1501. In at least one embodiment, the communication from the outlet cover 1539 may be done via a WI-FI network originating from the base station 1501. Other examples may feature alternative methods for communication such as Bluetooth, ZigBee, RF signals, IR signals, etc. In response to receiving a communication from the outlet cover 1539, all or targeted outlet cover(s) 1503, 1505, 1513, 1517, 1527, and/or 1543 could respond in a variety of ways. For instance, the other outlet cover(s) 1503, 1505, 1513, 1517, 1527, and/or 1543 could activate directional indicator(s) and/or light source(s), and/or Light Emitting Diodes (LEDs) that provide general lighting or visually indicate directions to occupants that may be inside the structure. The additionally lighting could provide necessary instruction to occupants so that they are alerted to the presence of an environmental condition that necessitates action on their part and/or provides directions to properly exit the structure. Other examples of potential responses by the other electrical outlets include but are not limited to emitting audible alarms and/or activating all or designated hazard suppression systems such as water sprinklers 1507, 1511, 1519, 1523, 1529, 1545, and/or 1549.

In other examples, the electrical outlet 1539 may communicate directly with a hazard suppression system—for example, the sprinkler head 1529 can be in the same room as the outlet cover 1539—for the suppression of a fire hazard 1539 immediately after it has been detected by a sensor incorporated into the outlet cover 1539. The outlet cover 1539 may also activate a light source to provide illumination or direction to anyone occupying the same room as the fire hazard 1537. An illuminated direction may be necessary for an occupant in the same room as the fire hazard 1537 if the room has diminished visibility due to the presence of excessive airborne contaminates 1533 emitted by the fire hazard 1539.

Each outlet cover(s) 1503, 1505, 1513, 1517, 1527, and/or 1543 may incorporate one or more sensors that direct an outlet cover(s) 1503, 1505, 1513, 1517, 1527, and/or 1543 to respond depending on the presence of one or more environmental conditions. For instance, an outlet cover(s) 1503, 1505, 1513, 1517, 1527, and/or 1543 may incorporate a light sensor as well as a smoke detector. The light sensor may be configured to detect diminished illumination in a room and activate a night light to increase the visibility for an occupant in the room, while the smoke detector may be configured to detect an accumulation of a certain level of airborne pollutants in a room that may have emanated from an ongoing fire hazard and activate a fire alarm after a predetermined threshold level of airborne pollutants has been detected. As a response to presence of a certain level of airborne pollutants, an outlet cover(s) 1503, 1505, 1513, 1517, 1527, and/or 1543 may also activate a directional indicator(s) or directional projection(s) 1561, 1563, 1565, 1567, 1569, 1571, and/or 1573 to provide direction to any occupant in the room to the nearest exit. The outlet cover system 1500 may incorporate any number of sensors, including sensors of different types, and may be configured to respond based on the observation(s) of one or more of said sensors.

In yet another example, the outlet cover system 1500 may feature connectivity to a device and/or user off site such as the structure owner in possession of a wireless device 1535. The outlet cover 1539 may sense the fire hazard 1537 in its immediate vicinity and communicate this fact via the base station 1501 directly or through intermediaries, such as other electrical outlets 1503, 1505, 1513, 1517, 1527, and/or 1543, to the structure owner through the wireless device 1535 so that the user may take appropriate action. The outlet cover system 1500 is not limited to any particular configuration or number of individual outlets in a residential or a commercial structure.

The outlet cover system 1500 may be utilized as an access point in a larger network. By functioning as an access point, an outlet cover 1503, 1505, 1513, 1517, 1527, 1539, and/or 1543 in the outlet cover system 1500 may also allow for data packets to be transmitted and received over the network. One or more outlet covers 1503, 1505, 1513, 1517, 1527, 1539, and/or 1543 in the outlet cover systems 1500 can be incorporated in a large structure 1551 and integrated into an existing network so that said network's range is extended. If a wireless device 1535 connects with one of the outlet covers 1503, 1505, 1513, 1517, 1527, 1539, and/or 1543, that outlet cover can function as an access point into the network so that data packets can be transmitted over the network to and from the wireless device. Because the outlet covers in the outlet cover system 1500 can be strategically located, each outlet cover 1503, 1505, 1513, 1517, 1527, 1539, and/or 1543 can function as an intermediary for data packets to be transmitted to and received from the next access point in the network, before arriving at its intended destination.

An existing wireless network can be expanded beyond the signal strength of a base station 1501. For example, a base station 1501, such as a Wi-Fi router may be connected to a modem (not shown) which is configured to connect to the Internet. A device (not shown) may be in a different part of a structure that is too far away from the base station 1501 itself to make a proper connection. By connecting the device to at least one outlet cover, 1503, 1505, 1513, 1517, 1527, 1539, and/or 1543, functioning as an access point, in the outlet cover system 1500, the device can communicate with the Internet by sending and receiving data packets to one or more of the outlet covers 1503, 1505, 1513, 1517, 1527, 1539, and/or 1543 in the outlet cover system 1500. The individual outlet covers 1503, 1505, 1513, 1517, 1527, 1539, and/or 1543, functioning as an intermediary, relay data to another access points in the network, until the data packet reaches the Wi-Fi router 1501 and then the modem connected to the Internet. This way, the connected device could have access to necessary emergency services available over the Internet and/or send and receive ordinary web communications.

The present disclosure may include a computing device that can include any of an application specific integrated circuit (ASIC), a microprocessor, a microcontroller, a digital signal processor (DSP), a field-programmable gate array (FPGA), or equivalent discrete or integrated logic circuitry. In some examples, the system may include multiple components, such as any combination of one or more microprocessors, one or more microcontrollers, one or more DSPs, one or more ASICs, or one or more FPGAs. It would also be understood that multiples of the circuits, processors, or controllers could be used in combination or in tandem, or multithreading. Additionally, it would be understood that a browser or program could be implemented on a mobile device or mobile computing device, such as, a phone, a mobile phone, a cell phone, a tablet, a laptop, a mobile computer, a personal digital assistant ("PDA"), a processor, a microprocessor, a micro controller, or other devices or electronic systems capable of connecting to a user interface and/or display system. A mobile computing device or mobile device may also operate on or in the same manner as the computing device disclosed herein or be based on improvements thereof.

The components of the present disclosure may include any discrete and/or integrated electronic circuit components that implement analog and/or digital circuits capable of producing the functions attributed to the modules herein. For example, the components may include analog circuits, e.g., amplification circuits, filtering circuits, and/or other signal conditioning circuits. The components may also include digital circuits, e.g., combinational or sequential logic circuits, memory devices, etc. Furthermore, the modules may comprise memory that may include computer-readable instructions that, when executed cause the modules to perform various functions attributed to the modules herein.

Memory may include any volatile, non-volatile, magnetic, or electrical media, such as a random access memory (RAM), dynamic random access memory (DRAM), static random access memory (SRAM), read-only memory (ROM), non-volatile RAM (NVRAM), electrically-erasable programmable ROM (EEPROM), flash memory, hard disks, or any other digital media. Additionally, there may also be a tangible non-transitory computer readable medium that contains machine instructions, such as, a (portable or internally installed) hard drive disc, a flash drive, a compact disc, a DVD, a zip drive, a floppy disc, optical medium, magnetic medium, or any other number of possible drives or discs, that are executed by the internal logic of a computing device. It would be understood that the tangible non-transitory computer readable medium could also be considered a form of memory or storage media.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

We claim:

1. An outlet cover comprising:

at least one plate having a front and a back, wherein one or more of the at least one plate is configured to fit over at least part of one of a light switch or an electrical outlet;

at least one arm comprising an electrical conductor extending rearward from the back of one or more of the at least one plate for receiving incoming electricity from an electrical source when the one or more of the at least one plate is affixed over the at least part of the light switch or the electrical outlet, and when the electrical source is electrically connected to the light switch or the electrical outlet;

a battery storing energy from the incoming electricity;

at least one light source configured to illuminate a region that is exterior to the outlet cover;

wherein the at least one light source comprises a first light source configured to emit light in a downward direction and a second light source configured to emit light in a horizontal or intermediate direction;

a control circuit electrically connected to the at least one light source, the at least one electrical conductor, and the battery;

wherein the control circuit is configured to:

in response to an ambient light condition and a first incoming electricity condition, power part or all of the at least one light source from the incoming electricity, and in response to a second incoming electricity condition, power part or all of the at least one light source from the battery.

2. The outlet cover of claim 1, wherein the at least one plate comprises a faceplate and a backplate removable from the faceplate, the at least one arm extending rearwardly from the backplate.

3. The outlet cover of claim 2, wherein the at least one arm is removably coupled to the backplate.

4. The outlet cover of claim 1, wherein the at least one light source comprises at least one LED.

5. The outlet cover of claim 1, further comprising detecting the ambient light condition by one or more sensors.

6. The outlet cover of claim 5, wherein the one or more sensors comprises one or more of a photo resistor, a phototransistor, and/or a photodiode.

7. The outlet cover of claim 1, wherein the first incoming electricity condition comprises a presence of the incoming electricity, and the second incoming electricity condition comprises a loss of the incoming electricity.

8. The outlet cover of claim 7, wherein the outlet cover detects the second incoming electricity condition by a power detection circuit.

9. The outlet cover of claim 1, wherein the ambient light condition comprises a loss of light condition exterior to the outlet cover.

10. The outlet cover of claim 1, wherein the control circuit is further configured to, in response to a second ambient light condition and the first incoming electricity condition, not power the at least one light source.

11. An outlet cover system comprising:

at least one plate having a front and a back, wherein one or more of the at least one plate is configured to fit over at least part of one of a light switch or an electrical outlet;

at least one arm comprising an electrical conductor extending rearward from the back of one or more of the at least one plate for receiving incoming electricity from an electrical source when the one or more of the at least one plate is affixed over the at least part of the light switch or the electrical outlet, and when the electrical source is electrically connected to the light switch or the electrical outlet;

a voltage regulation circuit regulating the incoming electricity to generate a regulated electrical power;

a battery storing energy from the regulated electrical power;

at least one light source connected to the battery and the regulated electrical power, and configured to illuminate a region that is exterior to the outlet cover;

wherein the at least one light source comprises a first light source configured to emit light in a downward direction and a second light source configured to emit light in a horizontal or intermediate direction;

a control circuit electrically connected to the at least one light source, the at least one electrical conductor, and the battery;

at least one sensor coupled to the control circuit and detecting one or both of an ambient light condition and an incoming electricity condition;

wherein the control circuit is configured to:

in response to the at least one sensor detecting an ambient light condition and a first incoming electricity condition, power part or all of the at least one light source from the regulated electrical power, and in response to the at least one sensor detecting a second incoming electricity condition, power part or all of the at least one light source from the battery.

12. The outlet cover system of claim 11, wherein the at least one plate comprises a faceplate and a backplate removable from the faceplate, the at least one arm extending rearwardly from the backplate.

13. The outlet cover system of claim 12, wherein the at least one arm is removably coupled to the backplate.

14. The outlet cover system of claim 11, wherein the at least one light source comprises at least one LED.

15. The outlet cover system of claim 11, wherein the one or more sensors is a photo resistor, a phototransistor, and/or a photodiode.

16. The outlet cover system of claim 11, wherein the first incoming electricity condition comprises a presence of the incoming electricity, and the second incoming electricity condition comprises a loss of the incoming electricity.

17. The outlet cover system of claim 16, wherein the outlet cover detects the second incoming electricity condition by a power detection circuit in communication with the control circuit.

18. The outlet cover system of claim 17, wherein the power detection circuit is in communication with the at least one sensor.

19. The outlet cover system of claim 11, wherein the ambient light condition comprises a loss of light condition exterior to the outlet cover.

20. The outlet cover system of claim 11, wherein the control circuit is further configured to, in response to the at least one sensor detecting a second ambient light condition and the first incoming electricity condition, not power the at least one light source.

* * * * *